(12) United States Patent
Sugimoto et al.

(10) Patent No.: US 11,048,076 B2
(45) Date of Patent: Jun. 29, 2021

(54) MIRROR UNIT, AND METHOD FOR MANUFACTURING THE MIRROR UNIT

(71) Applicant: HAMAMATSU PHOTONICS K.K., Hamamatsu (JP)

(72) Inventors: Tatsuya Sugimoto, Hamamatsu (JP); Tomofumi Suzuki, Hamamatsu (JP); Kyosuke Kotani, Hamamatsu (JP); Yutaka Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 188 days.

(21) Appl. No.: 16/456,747

(22) Filed: Jun. 28, 2019

(65) Prior Publication Data
US 2020/0409140 A1 Dec. 31, 2020

(51) Int. Cl.
*G02B 26/10* (2006.01)

(52) U.S. Cl.
CPC .................................. *G02B 26/10* (2013.01)

(58) Field of Classification Search
None
See application file for complete search history.

(56) References Cited

U.S. PATENT DOCUMENTS

| | | | | |
|---|---|---|---|---|
| 8,824,022 | B2 * | 9/2014 | Nakajima | G03G 15/011 358/474 |
| 9,864,142 | B2 * | 1/2018 | Sakamoto | G02B 6/4226 |
| 2003/0053156 | A1 * | 3/2003 | Satoh | H04N 1/126 358/511 |
| 2004/0017599 | A1 * | 1/2004 | Yang | B81B 3/0062 359/221.2 |
| 2005/0185237 | A1 * | 8/2005 | Nakajima | B41J 2/471 359/224.1 |
| 2008/0165333 | A1 * | 7/2008 | Kumazawa | G03F 7/70275 355/53 |
| 2008/0165334 | A1 * | 7/2008 | Kumazawa | G03F 7/70791 355/53 |
| 2008/0284078 | A1 | 11/2008 | Wolter et al. | |
| 2014/0293287 | A1 * | 10/2014 | Hirao | H01S 5/024 356/450 |
| 2015/0175054 | A1 * | 6/2015 | Yatsuda | F21S 41/255 362/465 |
| 2017/0207748 | A1 * | 7/2017 | Rinkio | H03B 5/30 |
| 2017/0357075 | A1 * | 12/2017 | Uchino | B81B 3/0045 |
| 2020/0124469 | A1 * | 4/2020 | Sugimoto | G01J 3/021 |
| 2020/0408597 | A1 * | 12/2020 | Sugimoto | G01J 3/12 |
| 2020/0409139 | A1 * | 12/2020 | Sugimoto | G02B 5/20 |

* cited by examiner

*Primary Examiner* — Jennifer D. Carruth
(74) *Attorney, Agent, or Firm* — Faegre Drinker Biddle & Reath LLP

(57) ABSTRACT

A mirror unit includes a mirror device, a light incident/emission portion, and a support portion. The mirror device includes a base, a movable mirror, and a drive unit. The light incident/emission portion includes a first joining portion joined to a region that is located between a first electrode pad and a second electrode pad, and at least one of the movable mirror and the drive unit in a first surface of the base, and a first main body portion. The support portion includes a second joining portion joined to a region that overlaps each of the first electrode pad and the second electrode pad when viewed from a first direction in a second surface of the base, and a second main body portion. The first main body portion is provided with a first light passage region that overlaps a mirror surface of the movable mirror when viewed from the first direction.

19 Claims, 15 Drawing Sheets

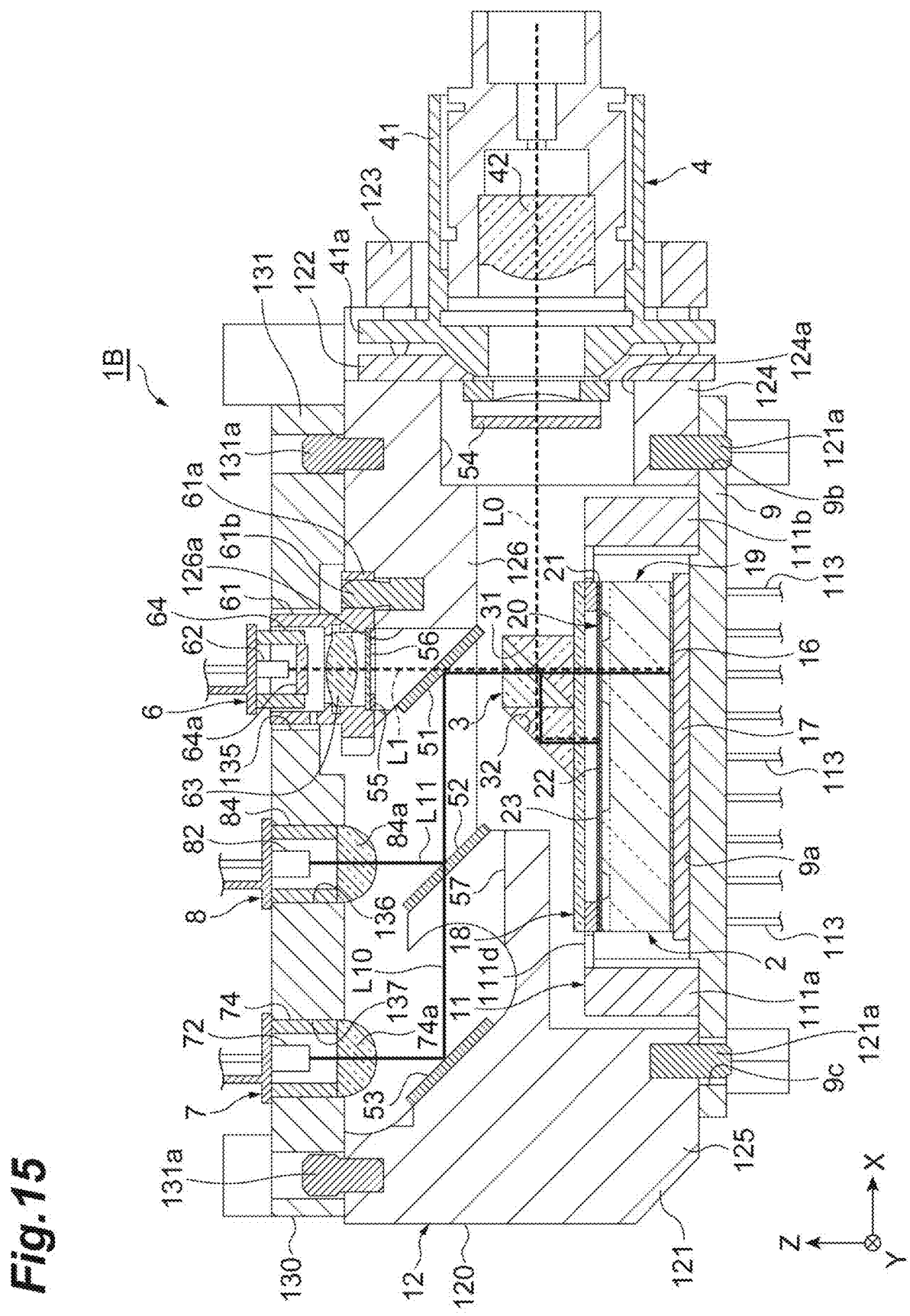

MIRROR UNIT, AND METHOD FOR MANUFACTURING THE MIRROR UNIT

TECHNICAL FIELD

The present disclosure relates to a mirror unit and a method for manufacturing a mirror unit.

BACKGROUND

As a micro electro mechanical system (MEMS) device constituted by a silicon on insulator (SOI) substrate, a mirror device including a base and a movable mirror that is supported in the base to be movable along a thickness direction of the base is known (for example, refer to specification of US Unexamined Patent Publication No. 2008/0284078).

SUMMARY

The above-described mirror device has attracted attention, for example, as a device capable of providing a high-accuracy fourier transformation type infrared spectral analyzer (FTIR), and thus a further reduction in size is demanded. As the reduction in size of the mirror device proceeds, realization of reliability of electric connection with the mirror device and an improvement of use efficiency of light becomes important.

An object of the present disclosure is to provide a mirror unit and a method for manufacturing a mirror unit which are capable of realizing reliability of electric connection with the mirror device and an improvement use efficiency of light.

According to an aspect of the present disclosure, there is provided a mirror unit including: a mirror device; a light incident/emission portion that is disposed on one side of the mirror device in a first direction; and a support portion that is disposed on the other side of the mirror device in the first direction. The mirror device includes a base that includes a first surface on the light incident/emission portion side and a second surface on the support portion side, a movable mirror in which a surface on the light incident/emission portion side is a mirror surface, and a drive unit that is configured to move the movable mirror along the first direction. The base is provided with a first electrode pad and a second electrode pad which are exposed to the first surface side. The first electrode pad is located on one side with respect to at least one of the movable mirror and the drive unit in a second direction along the first surface. The second electrode pad is located on the other side with respect to at least one of the movable mirror and the drive unit in the second direction. The light incident/emission portion includes a first joining portion that is joined to a region that is located between the first electrode pad and at least one of the movable mirror and the drive unit, and a region that is located between the second electrode pad and at least one of the movable mirror and the drive unit in the first surface, and a first main body portion that is connected to the first joining portion, and faces the movable mirror and the drive unit on the one side in the first direction. The support portion includes a second joining portion joined to a region that overlaps the first electrode pad when viewed from the first direction, and a region that overlaps the second electrode pad when viewed from the first direction in the second surface, and a second main body portion that is connected to the second joining portion, and faces the movable mirror and the drive unit on the other side in the first direction. The first main body portion is provided with a first light passage region that overlaps the mirror surface of the movable mirror when viewed from the first direction.

In the mirror unit, the second joining portion of the support portion is joined to a region that overlaps the first electrode pad when viewed from the first direction and a region that overlaps the second electrode pad when viewed from the first direction in the second surface of the base. Accordingly, it is possible to stably perform wire bonding with respect to each of the first electrode pad and the second electrode pad. In addition, the first joining portion of the light incident/emission portion is joined to a region that is located between the first electrode pad and at least one of the movable mirror and the drive unit, and a region that is located between the second electrode pad and at least one of the movable mirror and the drive unit in the first surface of the base. Accordingly, it is possible to make the first main body portion of the light incident/emission portion close to the mirror device without considering physical interference with a wire that is connected to each of the first electrode pad and the second electrode pad, or the like. The first main body portion is provided with the first light passage region that overlaps the mirror surface of the movable mirror when viewed from the first direction, and thus it is possible to employ a configuration in which an optical element such as a beam splitter unit that allows light to be incident and emitted to and from a mirror surface is made to be close to the mirror device. As described above, according to the mirror unit, it is possible to realize reliability of electric connection with the mirror device, and an improvement of use efficiency of light.

In the mirror unit of the present disclosure, the first joining portion may surround the movable mirror and the drive unit when viewed from the first direction. Accordingly, it is possible to realize stabilization of joining between the mirror device and the light incident/emission portion.

In the mirror unit of the present disclosure, the second joining portion may surround the movable mirror and the drive unit when viewed from the first direction. Accordingly, it is possible to realize stabilization of joining between the mirror device and the support portion.

In the mirror unit of the present disclosure, the first joining portion may surround the movable mirror and the drive unit when viewed from the first direction, the second joining portion may surround the movable mirror and the drive unit when viewed from the first direction, and a package that accommodates the movable mirror and the drive unit may be constituted by the base, the light incident/emission portion, and the support portion. Accordingly, it is possible to suppress particles from being adhered to the movable mirror and the drive unit.

In the mirror unit of the present disclosure, the first main body portion may include a first lateral surface on the first electrode pad side in the second direction, and a second lateral surface on the second electrode pad side in the second direction, the first lateral surface may include a surface that is spaced away from the first electrode pad in the second direction as being spaced away from the first electrode pad in the first direction, and the second lateral surface may include a surface that is spaced away from the second electrode pad in the second direction as being spaced away from the second electrode pad in the first direction. Accordingly, when performing wire bonding with respect to each of the first electrode pad and the second electrode pad, it is possible to prevent a capillary for wire bonding from coming into contact with the first main body portion.

The mirror unit of the present disclosure may further include a fixed mirror which is provided on a surface of the second main body portion on a side opposite to the mirror device, and in which a surface on the mirror device side is a mirror surface. The first main body portion may be provided with a second light passage region that overlaps the mirror surface of the fixed mirror when viewed from the first direction, the mirror device may be provided with a third light passage region that overlaps the mirror surface of the fixed mirror and the second light passage region when viewed from the first direction, and the second main body portion may be provided with a fourth light passage region that overlaps the mirror surface of the fixed mirror, the second light passage region, and the third light passage region when viewed from the first direction. Accordingly, for example, when a beam splitter unit is disposed in the first main body portion, it is possible to dispose an interference optical system constituted by the beam splitter unit, the movable mirror, and the fixed mirror with spatial efficiency.

In the mirror unit of the present disclosure, the first light passage region and the second light passage region may be light transmission regions which are provided in the first main body portion, the third light passage region may be a hole that is provided in the mirror device, and the fourth light passage region may be a light transmission region that is provided in the second main body portion. Accordingly, for example, when the beam splitter unit is disposed in the first main body portion, it is possible to correct an optical path difference that occurs between an optical path between the beam splitter unit and the movable mirror and an optical path between the beam splitter unit and the fixed mirror by adjusting a length of the fourth light passage region.

The mirror unit of the present disclosure may further include a beam splitter unit that is disposed in the first main body portion and constitutes an interference optical system in combination with the movable mirror and the fixed mirror. Accordingly, it is possible to dispose the interference optical system constituted by the beam splitter unit, the movable mirror, and the fixed mirror in the mirror unit with spatial efficiency.

In the mirror unit of the present disclosure, the first joining portion and the first main body portion may be formed separately from each other. Accordingly, it is possible to improve the degree of freedom of design of each of the first joining portion and the first main body portion.

In the mirror unit of the present disclosure, the second joining portion and the second main body portion may be formed integrally with each other. Accordingly, it is possible to suppress an increase in the number of parts.

According to another aspect of the present disclosure, there is provided a mirror unit including: a mirror device; a light incident/emission portion that is disposed on one side of the mirror device in a first direction; and a support portion that is disposed on the other side of the mirror device in the first direction. The mirror device includes a base that includes a first surface on the light incident/emission portion side and a second surface on the support portion side, a movable mirror in which a surface on the light incident/emission portion side is a mirror surface, and a drive unit that is configured to move the movable mirror along the first direction. The base is provided with a first electrode pad that is exposed to the first surface side. The first electrode pad is located on one side with respect to at least one of the movable mirror and the drive unit in a second direction along the first surface. The light incident/emission portion includes a first joining portion that is joined to a region that is located between the first electrode pad and at least one of the movable mirror and the drive unit in the first surface, and a first main body portion that is connected to the first joining portion, and faces the movable mirror and the drive unit on the one side in the first direction. The support portion includes a second joining portion joined to a region that overlaps the first electrode pad when viewed from the first direction in the second surface, and a second main body portion that is connected to the second joining portion, and faces the movable mirror and the drive unit on the other side in the first direction. The first main body portion is provided with a first light passage region that overlaps the mirror surface of the movable mirror when viewed from the first direction.

In the mirror unit, the second joining portion of the support portion is joined to a region that overlaps the first electrode pad when viewed from the first direction in the second surface of the base. Accordingly, it is possible to stably perform wire bonding with respect to the first electrode pad. In addition, the first joining portion of the light incident/emission portion is joined to a region that is located between the first electrode pad and at least one of the movable mirror and the drive unit in the first surface of the base. Accordingly, it is possible to make the first main body portion of the light incident/emission portion close to the mirror device without considering physical interference with a wire that is connected to the first electrode pad, or the like. The first main body portion is provided with the first light passage region that overlaps the mirror surface of the movable mirror when viewed from the first direction, and thus it is possible to employ a configuration in which an optical element such as a beam splitter unit that allows light to be incident and emitted to and from a mirror surface is made to be close to the mirror device. As described above, according to the mirror unit, it is possible to realize reliability of electric connection with the mirror device, and an improvement of use efficiency of light.

According to still another aspect of the present disclosure, there is provided a method for manufacturing the above-described mirror unit. The method includes: a first process of preparing a first wafer including a plurality of the light incident/emission portions, a second wafer including a plurality of the mirror devices, and a third wafer including a plurality of the support portions; a second process of joining the first wafer, the second wafer, and the third wafer in such a manner that one piece of the light incident/emission portions, one piece of the mirror devices, and one piece of the support portions correspond to each other, and a third process of cutting the first wafer, the second wafer, and the third wafer which are joined into a plurality of the mirror units. Openings, through which the first electrode pad and the second electrode pad provided in the second wafer are exposed, are formed in the first wafer.

According to the method for manufacturing a mirror unit, it is possible to manufacture a mirror unit, which is capable of realizing reliability of electric connection with the mirror device and an improvement of use efficiency of light, with efficiency.

In the method for manufacturing a mirror unit, in the second process, the first wafer, the second wafer, and the third wafer may be joined to each other by direct bonding. Accordingly, it is possible to strongly join the first wafer, the second wafer, and the third wafer.

In the method for manufacturing a mirror unit, in the first process, a fourth wafer including a plurality of the first main body portions and a fifth wafer including a plurality of the first joining portions may be prepared, and the first wafer may be prepared by joining the fourth wafer and the fifth wafer in such a manner that one piece of the first main body portions and one piece of the first joining portions correspond to each other. Accordingly, it is possible to prepare the first wafer with efficiency.

In the method for manufacturing a mirror unit, in the first process, the fourth wafer and the fifth wafer may be joined to each other by direct bonding. Accordingly, it is possible to strongly join the fourth wafer and the fifth wafer.

In the method for manufacturing a mirror unit, in the first process, the fourth wafer may be prepared by sandblasting a first glass wafer, and the fifth wafer may be prepared by etching a silicon wafer. Accordingly, it is possible to form the plurality of first main body portions and the plurality of first joining portions with efficiency.

In the method for manufacturing a mirror unit, in the first process, the third wafer may be prepared by sandblasting a second glass wafer. Accordingly, it is possible to form the plurality of support portions with efficiency.

In the method for manufacturing a mirror unit, in the first process, the third wafer may be prepared by forming a fixed mirror layer including a plurality of fixed mirrors corresponding to the plurality of support portions in advance on a surface that is opposite to a surface to which the second wafer is joined in a surface of the second glass wafer. Accordingly, it is possible to form the plurality of fixed mirrors with efficiency.

According to still another aspect of the present disclosure, there is provided a method for manufacturing the above-described mirror unit. The method includes: a first process of preparing a first wafer including a plurality of the light incident/emission portions, a second wafer including a plurality of the mirror devices, and a third wafer including a plurality of the support portions; a second process of joining the first wafer, the second wafer, and the third wafer in such a manner that one piece of the light incident/emission portions, one piece of the mirror devices, and one piece of the support portions correspond to each other; and a third process of cutting the first wafer, the second wafer, and the third wafer which are joined into a plurality of the mirror units. An opening, through which the first electrode pad provided in the second wafer is exposed, is formed in the first wafer.

In the method for manufacturing a mirror unit, it is possible to manufacture the mirror unit, which is capable of realizing reliability of electric connection with the mirror device and an improvement of use efficiency of light, with efficiency.

BRIEF DESCRIPTION OF THE DRAWINGS

FIG. 15 is a cross-sectional view of an optical module of a second embodiment.

DETAILED DESCRIPTION

Figure 1:
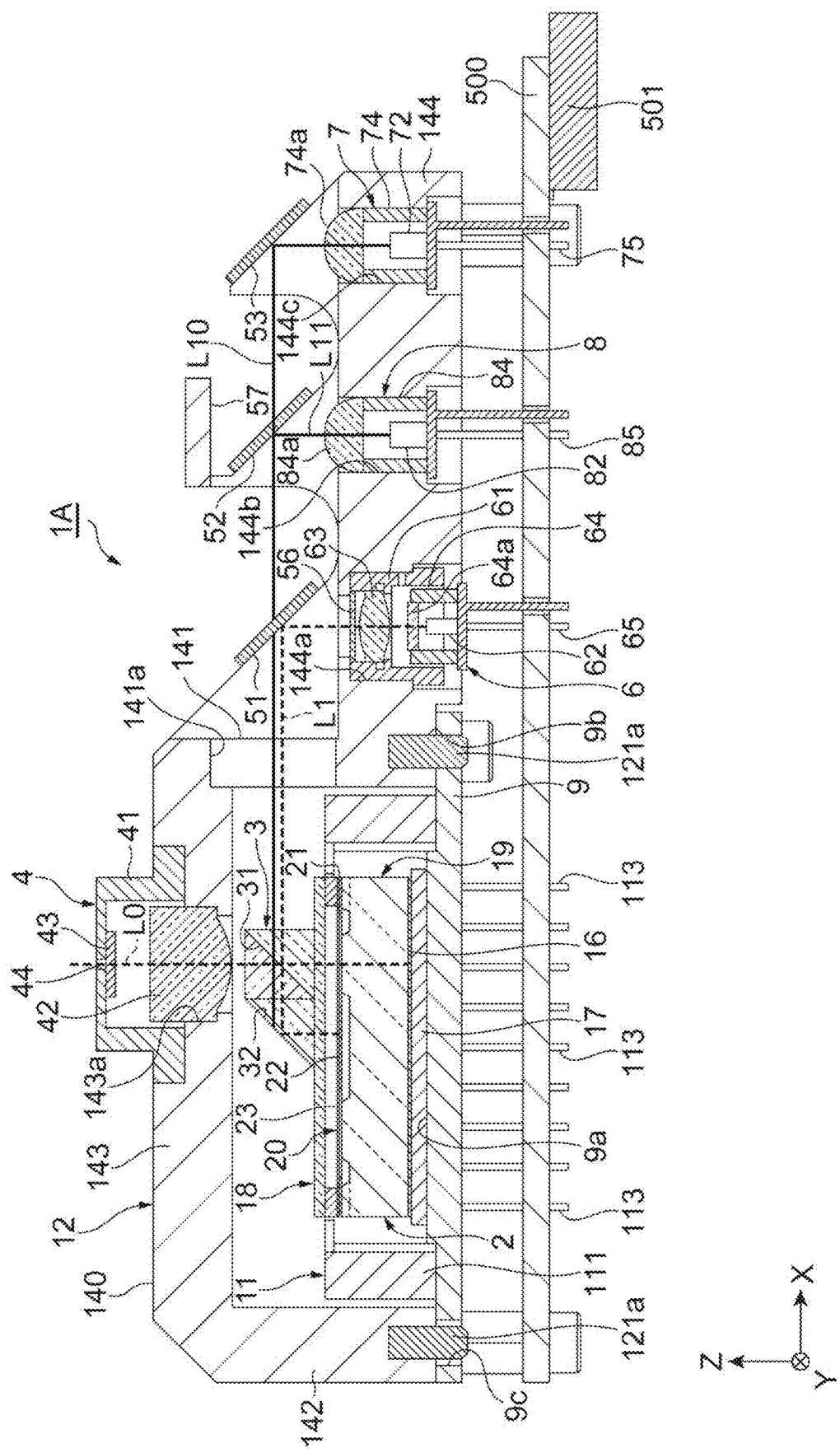
FIG. 1 is a cross-sectional view of an optical module of a first embodiment.

Hereinafter, embodiments of the present disclosure will be described in detail with reference to the accompanying drawings. The same reference numeral will be given to the same or equivalent portion in the drawings, and redundant description thereof will be omitted.

First Embodiment

[Configuration of Optical Module]

As illustrated in FIG. 1, an optical module 1A includes a mirror unit 2, a beam splitter unit 3, a light incident unit 4, a first light detector 6, a second light source 7, a second light detector 8, a support 9, a wiring structure 11, and a support structure 12. The mirror unit 2 is disposed on one side of the support 9 in a Z-axis direction, and is attached to a surface 9a of the support 9 through a stress mitigation substrate 17. For example, the support 9 is formed of copper tungsten, and has a rectangular plate shape. The mirror unit 2 includes a movable mirror 22 that moves along the Z-axis direction, and a fixed mirror 16 of which a position is fixed (details thereof will be described later). For example, the Z-axis direction is a vertical direction, and the one side in the Z-axis direction is an upper side.

The beam splitter unit 3 is disposed on one side of the mirror unit 2 in the Z-axis direction, and is supported by the mirror unit 2. The light incident unit 4 is disposed on one side of the beam splitter unit 3 in the Z-axis direction, and is supported by the support structure 12. The first light detector 6, the second light source 7, and the second light detector 8 are disposed on one side of the mirror unit 2 in an X-axis direction, and are supported by the support structure 12. For example, the support structure 12 is attached to the support 9 by a bolt. The wiring structure 11 is attached to the surface 9a of the support 9.

In the optical module 1A, an interference optical system is constituted by the beam splitter unit 3, the movable mirror 22, and the fixed mirror 16 with respect to each of measurement light L0 and laser light L10. The interference optical system which is constituted with respect to each of the measurement light L0 and the laser light L10 is, for example, a Michelson interference optical system.

With regard to the measurement light L0, interference light L1 of measurement light is detected as follows. That is, when the measurement light L0 that is incident from a first light source (not illustrated) through a measurement target (not illustrated) or the measurement light L0 that is generated from the measurement target (for example, light emitted from the measurement target itself) is incident to the beam splitter unit 3 from the light incident unit 4, the measurement light L0 is divided into a part and the remainder in the beam splitter unit 3. The part of the measurement light L0 is reflected by the movable mirror 22 that reciprocates in the Z-axis direction, and returns to the beam splitter unit 3. On the other hand, the remainder of the measurement light L0 is reflected by the fixed mirror 16 and returns to the beam splitter unit 3. The part and the remainder of the measurement light L0, which returns to the beam splitter unit 3, are emitted from the beam splitter unit 3 as the interference light L1, and the interference light L1 of the measurement light is detected by the first light detector 6.

With regard to the laser light L10, interference light L11 of laser light is detected as follows. That is, when the laser light L10 emitted from the second light source 7 is incident to the beam splitter unit 3, the laser light L10 is divided into a part and the remainder in the beam splitter unit 3. The part of the laser light L10 is reflected by the movable mirror 22 that reciprocates in the Z-axis direction, and returns to the beam splitter unit 3. On the other hand, the remainder of the laser light L10 is reflected by the fixed mirror 16 and returns to the beam splitter unit 3. The part and the remainder of the laser light L10, which return to the beam splitter unit 3, are emitted from the beam splitter unit 3 as the interference light L11, and the interference light L11 of the laser light is detected by the second light detector 8.

According to the optical module 1A, measurement of a position of the movable mirror 22 in the Z-axis direction can be measured based on a detection result of the interference light L11 of the laser light, and spectral analysis with respect to the measurement target can be performed based on a measurement result of the position, and a detection result of the interference light L1 of the measurement light.

[Configuration of Mirror Unit]

As illustrated in FIG. 2, FIG. 4, FIG. 5, and FIG. 6, the mirror unit 2 includes a mirror device 20, a light incident/emission portion 18, a support portion 19, and the fixed mirror 16. The light incident/emission portion 18 is disposed on one side of the mirror device 20 in the Z-axis direction (first direction). The support portion 19 is disposed on the other side of the mirror device 20 in the Z-axis direction. The fixed mirror 16 is disposed on the other side of the support portion 19 in the Z-axis direction. In the fixed mirror 16, a surface on the mirror device 20 side is a mirror surface 16a.

The mirror device 20 includes a base 21, the movable mirror 22, and a drive unit 23. The base 21 includes a first surface 21a on the light incident/emission portion 18 side, and a second surface 21b on the support portion 19 side. For example, the base 21 has a rectangular plate shape, and a size of approximately 10 mm×15 mm×0.35 mm (thickness). The movable mirror 22 includes a movable portion 22b in which a mirror surface 22a is provided. In the movable mirror 22, a surface on the light incident/emission portion 18 side is the mirror surface 22a. The movable mirror 22 is supported in the base 21 to be movable along the Z-axis direction (direction interesting the first surface) perpendicular to the first surface 21a. The drive unit 23 is configured to move the movable mirror 22 along the Z-axis direction.

The mirror device 20 is provided with a pair of light passage regions 24 and 25. The pair of light passage regions 24 and 25 are holes (openings) provided in the mirror device 20. The pair of light passage regions 24 and 25 are respectively disposed on both sides of the movable mirror 22 in the X-axis direction. The light passage region (third light passage region) 24 overlap the mirror surface 16a of the fixed mirror 16 when viewed from the Z-axis direction. In the optical module 1A, the light passage region 25 does not function as a light passage region.

Figure 5:
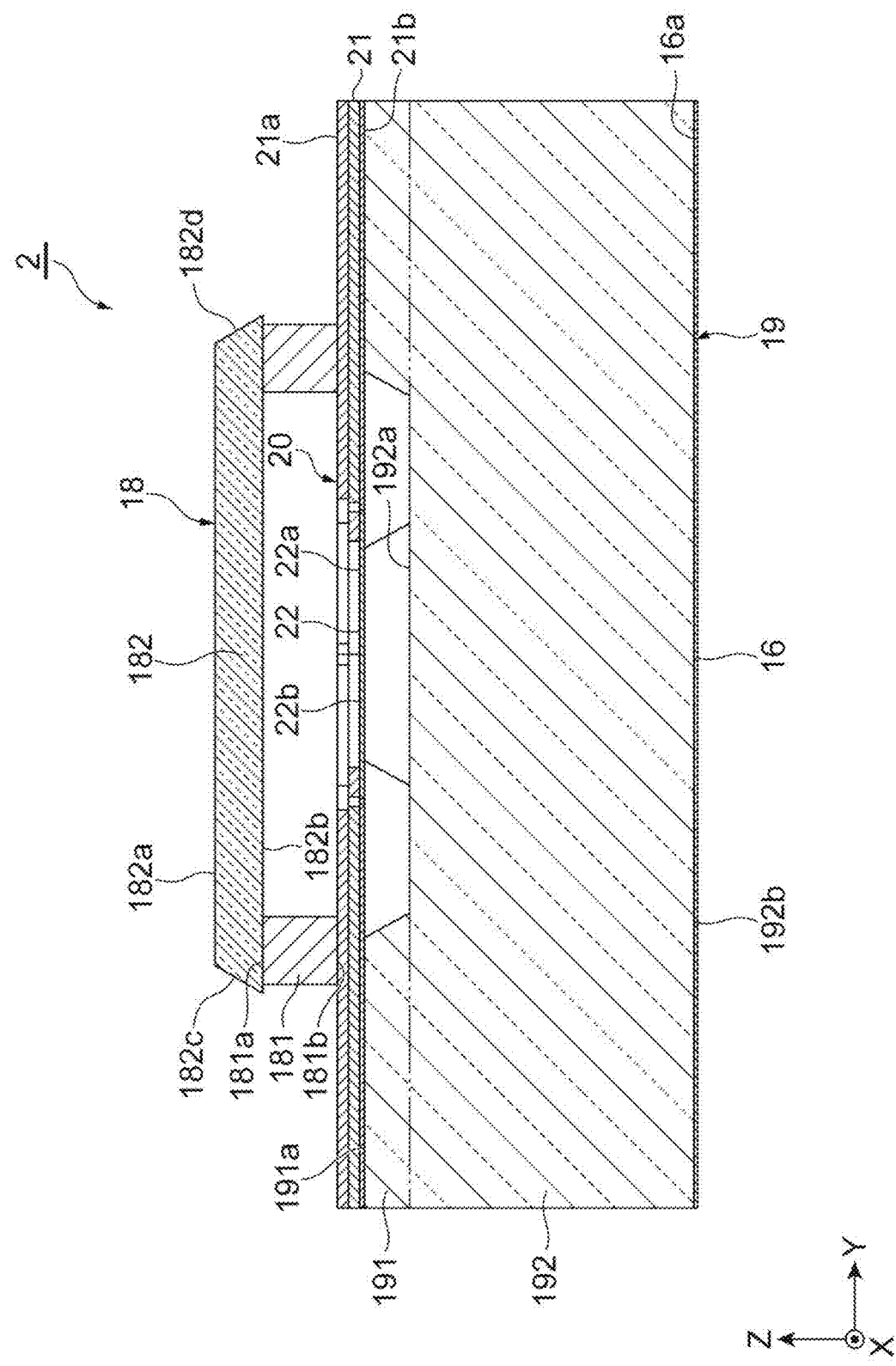
FIG. 5 is a cross-sectional view taken along line V-V in the mirror unit illustrated in FIG. 2.

Here, a configuration of the mirror device 20 will be described in detail with reference to FIG. 2, FIG. 5, and FIG. 6. FIG. 5 is a schematic cross-sectional view of the mirror device 20 illustrated in FIG. 3, and FIG. 5 schematically illustrates the mirror device 20, for example, in a state in which dimensions in the Z-axis direction are enlarged in comparison to actual dimensions.

The base 21, the movable unit 22b of the movable mirror 22, and the drive unit 23 are constituted by a silicon on insulator (SOI) substrate (semiconductor substrate) 100. That is, the mirror device 20 is constituted by the SOI substrate 100. For example, the mirror device 20 is formed in a rectangular plate shape. The SOI substrate 100 includes a support layer 101, a device layer 102, and an intermediate layer 103. The support layer 101 is a first silicon layer (a first semiconductor layer). The device layer 102 is a second silicon layer (a second semiconductor layer). The intermediate layer 103 is an insulating layer that is disposed between the support layer 101 and the device layer 102. The SOI substrate 100 includes the support layer 101, the intermediate layer 103, and the device layer 102 in this order from the one side in the Z-axis direction.

The base 21 is constituted by a part of the support layer 101, the device layer 102, and the intermediate layer 103. The first surface 21a of the base 21 is a surface of the support layer 101 which is opposite to the intermediate layer 103. The second surface 21b of the base 21 is a surface of the device layer 102 which is opposite to the intermediate layer 103. The support layer 101 that constitutes the base 21 is thicker than the device layer 102 that constitutes the base 21. For example, the thickness of the support layer 101 that constitutes the base 21 is approximately four times the thickness of the device layer 102 that constitutes the base 21. As will be described later, in the mirror unit 2, the second surface 21b of the base 21 and a third surface 13a of the optical function member 13 are jointed to each other (refer to FIG. 3 and FIG. 4).

The movable mirror 22 is disposed in a state in which an intersection between an axial line R1 and an axial line R2 is set as the central position (gravity center position). The axial line R1 is a straight line that extends in the X-axis direction. The axial line R2 is a straight line that extends in a Y-axis direction (a second direction that is perpendicular to the first direction and the third direction). When viewed from the Z-axis direction, in the mirror device 20, a portion other than a portion that overlaps a sixth surface 21d of the base 21 to be described later has a shape that is linearly symmetric to each of the axial line R1 and the axial line R2.

The movable mirror 22 (movable unit 22b) includes an arrangement portion 221, a frame portion 222, a pair of connection portions 223, and a beam portion 224. The arrangement portion 221, the frame portion 222, and the pair of connection portions 223 are constituted by a part of the device layer 102. The arrangement portion 221 has a circular shape when viewed from the Z-axis direction. The arrangement portion 221 includes a central portion 221a and an edge portion 221b. For example, the mirror surface 22a is provided on a surface 221as of the central portion 221a on the one side in the Z-axis direction by forming a metal film (metal layer) thereon. The mirror surface 22a extends perpendicular to the Z-axis direction, and has a circular shape. The surface 221as of the central portion 221a is a surface on the intermediate layer 103 side in the device layer 102. The mirror surface 22a is located on the other side in the Z-axis direction in comparison to the first surface 21a of the base 21. In other words, the first surface 21a is located on the one side in the Z-axis direction in comparison to the mirror surface 22a. The edge portion 221b surrounds the central portion 221a when viewed from the Z-axis direction.

The frame portion 222 extends in an annular shape to surround the arrangement portion 221 with a predetermined gap from the arrangement portion 221 when viewed from the Z-axis direction. For example, the frame portion 222 has a circular ring shape when viewed from the Z-axis direction. Each of the pair of connection portions 223 connects the arrangement portion 221 and the frame portion 222 to each other. The pair of connection portions 223 are respectively disposed on both sides of the arrangement portion 221 in the Y-axis direction.

The beam portion 224 is constituted by the support layer 101 and the intermediate layer 103 which are disposed on the device layer 102. The beam portion 224 includes an inner beam portion 224a, an outer beam portion 224b, and a pair of connection beam portions 224c. The inner beam portion 224a is disposed on a surface of the edge portion 221b on the one side in the Z-axis direction. The inner beam portion 224a surrounds the mirror surface 22a when viewed from the Z-axis direction. For example, an outer edge of the inner beam portion 224a extends along an outer edge of the arrangement portion 221 with a predetermined gap from the outer edge of the arrangement portion 221 when viewed from the Z-axis direction. An inner edge of the inner beam portion 224a extends along an outer edge of the mirror surface 22a with a predetermined gap from the outer edge of the mirror surface 22a when viewed from the Z-axis direction. An end surface 224as of the inner beam portion 224a on the one side in the Z-axis direction is located on the one side in the Z-axis direction in comparison to the mirror surface 22a.

The outer beam portion 224b is disposed on a surface of the frame portion 222 on the one side in the Z-axis direction. The outer beam portion 224b surrounds the inner beam portion 224a and the mirror surface 22a when viewed from the Z-axis direction. For example, an outer edge of the outer beam portion 224b extends along an outer edge of the frame portion 222 with a predetermined gap from the outer edge of the frame portion 222 when viewed from the Z-axis direction. An inner edge of the outer beam portion 224b extends along an inner edge of the frame portion 222 with a predetermined gap from the inner edge of the frame portion 222 when viewed from the Z-axis direction. An end surface 224bs of the outer beam portion 224b on the one side in the Z-axis direction is located on the one side in the Z-axis direction in comparison to the mirror surface 22a.

The pair of connection beam portions 224c are respectively disposed on surfaces of the pair of connection portions 223 on the one side in the Z-axis direction. The connection beam portions 224c connect the inner beam portion 224a and the outer beam portion 224b to each other. End surfaces 224cs of the connection beam portions 224c on the one side in the Z-axis direction are located on the one side in the Z-axis direction in comparison to the mirror surface 22a.

The thickness of the inner beam portion 224a, the thickness of the outer beam portion 224b, and the thickness of the respective connection beam portions 224c in the Z-axis direction are the same as each other. That is, the thickness of the support layer 101 that constitutes the inner beam portion 224a, the outer beam portion 224b, and the respective connection beam portions 224c is the same in each case. The end surface 224as of the inner beam portion 224a, the end surface 224bs of the outer beam portion 224b, and the end surfaces 224cs of the respective connection beam portions 224c are located on the same plane perpendicular to the Z-axis direction. The support layer 101 that constitutes the inner beam portion 224a, the outer beam portion 224b, and the respective connection beam portions 224c is thinner than the support layer 101 that constitutes the base 21. Accordingly, the end surfaces 224as, 224bs, and 224cs are located on the one side in the Z-axis direction in comparison to the first surface 21a of the base 21. In other words, the first surface 21a is located on the other side in the Z-axis direction in comparison to the end surfaces 224as, 224bs, and 224cs.

When viewed from the Z-axis direction, a width of the outer beam portion 224b is wider than a width of the inner beam portion 224a. The width of the inner beam portion 224a when viewed from the Z-axis direction is a length of the inner beam portion 224a in a direction perpendicular to the extending direction of the inner beam portion 224a, and is a length of the inner beam portion 224a in a radial direction of the inner beam portion 224a in this embodiment. This is also true of a width of the outer beam portion 224b when viewed from the Z-axis direction. A width of each of the connection beam portions 224c is wider than the width of each of the inner beam portion 224a and the outer beam portion 224b. The width of each of the connection beam portion 224c is a length of each of the connection beam portion 224c along the extending direction of the inner beam portion 224a.

The drive unit 23 includes a first elastic support unit 26, a second elastic support unit 27, and an actuator unit 28. The first elastic support unit 26, the second elastic support unit 27, and the actuator unit 28 are constituted by a part of the device layer 102.

Each of the first elastic support unit 26 and the second elastic support unit 27 is connected between the base 21 and the movable mirror 22. The first elastic support unit 26 and the second elastic support unit 27 support the movable mirror 22 so that the movable mirror 22 (movable unit 22b) can move in the Z-axis direction.

The first elastic support unit 26 includes a pair of levers 261, a first link member 262, a second link member 263, a pair of beam members 264, an intermediate member 265, a pair of first torsion bars (first torsion support portions) 266, a pair of second torsion bars (second torsion support portions) 267, a pair of non-linearity mitigation springs 268, and a plurality of electrode support portions 269.

The pair of levers 261 are respectively disposed on both sides of the light passage opening 24 in the Y-axis direction, and face each other in the Y-axis direction. Each of the levers 261 has a plate shape that extends along a plane perpendicular to the Z-axis direction. The lever 261 includes a first portion 261a, a second portion 261b that is disposed on a side opposite to the movable mirror 22 with respect to the first portion 261a, and a third portion 261c that is connected to the first portion 261a and the second portion 261b. The first portion 261a and the second portion 261b extend in the X-axis direction. A length of the first portion 261a in the X-axis direction is shorter than a length of the second portion 261b in the X-axis direction. The third portions 261c of the pair of levers 261 obliquely extend to be spaced away from each other as going away from the movable mirror 22.

The first link member 262 bridges first ends 261d of the pair of levers 261 on a side opposite to the movable mirror 22. The first link member 262 has a plate shape that extends along a plane perpendicular to the Z-axis direction, and extends in the Y-axis direction. The second link member 263 bridges second ends 261e of the pair of levers 261 on the movable mirror 22 side. The second link member 263 has a plate shape that extends along a plane perpendicular to the Z-axis direction, and extends in the Y-axis direction. A width of the second link member 263 in the X-axis direction is narrower than a width of the first link member 262 in the X-axis direction. A length of the second link member 263 in the Y-axis direction is shorter than a length of the first link member 262 in the Y-axis direction.

The pair of beam members 264 respectively bridge the second portions 261b of the pair of levers 261 and the first link member 262. The respective beam members 264 have a plate shape that extends along a plane perpendicular to the Z-axis direction. The pair of beam members 264 obliquely extend to approach each other as going away from the movable mirror 22. The pair of levers 261, the first link member 262, the second link member 263, and the pair of beam members 264 define the light passage opening 24. The light passage opening 24 has a polygonal shape when viewed from the Z-axis direction. For example, the light passage opening 24 is a cavity (hole). Alternatively, a material having optical transparency with respect to the measurement light L0 and the laser light L0 may be disposed in the light passage opening 24.

The intermediate member 265 has a plate shape that extends along a plane perpendicular to the Z-axis direction, and extends in the Y-axis direction. The intermediate member 265 is disposed between the movable mirror 22 and the second link member 263 (in other words, between the movable mirror 22 and the light passage opening 24). The intermediate member 265 is connected to the movable mirror 22 through the non-linearity mitigation springs 268 as to be described later.

The pair of first torsion bars 266 respectively bridge the first end 261d of one lever 261 and the base 21, and the first end 261d of the other lever 261 and the base 21. That is, the pair of first torsion bars 266 are respectively connected between the pair of levers 261 and the base 21. The first torsion bars 266 extend in the Y-axis direction. The pair of first torsion bars 266 are disposed on the same central line parallel to the Y-axis direction. In this embodiment, the central line of the first torsion bars 266 and the central line of the first link member 262 are located on the same straight line. A protrusion 261f that protrudes outward in the Y-axis direction is provided in each of the first ends 261d of the levers 261, and each of the first torsion bars 266 is connected to the protrusion 261f.

The pair of second torsion bars 267 respectively bridge the second end 261e of one lever 261 and one end of the intermediate member 265, and the second end 261e of the other lever 261 and the other end of the intermediate member 265. That is, the pair of second torsion bars 267 are respectively connected between the pair of levers 261 and the movable mirror 22. The respective second torsion bars 267 extend in the Y-axis direction. The pair of second torsion bars 267 are disposed on the same central line parallel to the Y-axis direction.

The pair of non-linearity mitigation springs 268 are connected between the movable mirror 22 and the intermediate member 265. That is, the pair of non-linearity mitigation springs 268 are connected between the movable mirror 22 and the second torsion bar 267. Each of the non-linearity mitigation springs 268 includes a meandering portion 268a that extends in a meandering manner when viewed from the Z-axis direction. The meandering portion 268a includes a plurality of straight portions 268b which extend in the Y-axis direction and are aligned in the X-axis direction, and a plurality of folded portions 268c which alternately connect both ends of the plurality of straight portions 268b. One end of the meandering portion 268a is connected to the intermediate member 265, and the other end of the meandering portion 268a is connected to the frame portion 222. In the meandering portion 268a, a portion on the frame portion 222 side has a shape along the outer edge of the frame portion 222.

The non-linearity mitigation spring 268 is constituted as follows. In a state in which the movable mirror 22 has moved in the Z-axis direction, the amount of deformation of the non-linearity mitigation spring 268 around the Y-axis direction becomes smaller than the amount of deformation of each of the first torsion bar 266 and the second torsion bar 267 around the Y-axis direction, and the amount of deformation of the non-linearity mitigation spring 268 in the X-axis direction becomes larger than the amount of deformation of each of the first torsion bar 266 and the second torsion bar 267 in the X-axis direction. Accordingly, it is possible to suppress occurrence of non-linearity in twist deformation of the first torsion bar 266 and the second torsion bar 267, and it is possible to suppress deterioration of control characteristics of the movable mirror 22 due to the non-linearity. The amount of deformation of the first torsion bar 266, the second torsion bar 267, and the non-linearity mitigation spring 268 around the Y-axis direction represents, for example, an absolute value of a twist amount (twist angle). The amount of deformation of the first torsion bar 266, the second torsion bar 267, and the non-linearity mitigation spring 268 in the X-axis direction represents, for example, an absolute value of a deflection amount. The amount of deformation of a member around the Y-axis direction represents the amount of deformation of the member in a peripheral direction of a circle of which the center is set to an axial line that passes through the center of the member and is parallel to the Y-axis. This is also true of first torsion bars 276, second torsion bars 277, and a non-linearity mitigation spring 278 to be described later.

The plurality of electrode support portions 269 include a pair of first electrode support portions 269a, a pair of second electrode support portions 269b, and a pair of third electrode support portions 269c. Each of the electrode support portions 269a, 269b, and 269c has a plate shape that extends along a plane perpendicular to the Z-axis direction, and extends in the Y-axis direction. Each of the electrode support portions 269a, 269b, and 269c extends from the second portion 261b of the lever 261 toward a side opposite to the light passage opening 24. The pair of first electrode support portions 269a are disposed on the same central line parallel to the Y-axis direction. The pair of second electrode support portions 269b are disposed on the same central line parallel to the Y-axis direction. The pair of third electrode support portions 269c are disposed on the same central line parallel to the Y-axis direction. In the X-axis direction, the first electrode support portions 269a, the second electrode support portions 269b, and the third electrode support portions 269c are aligned in this order from the movable mirror 22 side.

The second elastic support unit 27 includes a pair of levers 271, a first link member 272, a second link member 273, a pair of beam members 274, an intermediate member 275, a pair of first torsion bars (first torsion support portions) 276, a pair of second torsion bars (second torsion support portions) 277, a pair of non-linearity mitigation springs 278, and a plurality of electrode support portions 279.

The pair of levers 271 are respectively disposed on both sides of the light passage opening 25 in the Y-axis direction, and face each other in the Y-axis direction. Each of the levers 271 has a plate shape that extends along a plane perpendicular to the Z-axis direction. The lever 271 includes a first portion 271a, a second portion 271b that is disposed on a side opposite to the movable mirror 22 with respect to the first portion 271a, and a third portion 271c that is connected to the first portion 271a and the second portion 271b. The first portion 271a and the second portion 271b extend in the X-axis direction. A length of the first portion 271a in the X-axis direction is shorter than a length of the second portion 271b in the X-axis direction. The third portions 271c of the pair of levers 271 obliquely extend to be spaced away from each other as going away from the movable mirror 22.

The first link member 272 bridges first ends 271d of the pair of levers 271 on a side opposite to the movable mirror 22. The first link member 272 has a plate shape that extends along a plane perpendicular to the Z-axis direction, and extends in the Y-axis direction. The second link member 273 bridges second ends 271e of the pair of levers 271 on the movable mirror 22 side. The second link member 273 has a plate shape that extends along a plane perpendicular to the Z-axis direction, and extends in the Y-axis direction. A width of the second link member 273 in the X-axis direction is narrower than a width of the first link member 272 in the X-axis direction. A length of the second link member 273 in the Y-axis direction is shorter than a length of the first link member 272 in the Y-axis direction.

The pair of beam members 274 respectively bridge the second portions 271b of the pair of levers 271 and the first link member 272. The respective beam members 274 have a plate shape that extends along a plane perpendicular to the Z-axis direction. The pair of beam members 274 obliquely extend to approach each other as going away from the movable mirror 22. The pair of levers 271, the first link member 272, the second link member 273, and the pair of beam members 274 define the light passage opening 25. The light passage opening 25 has a polygonal shape when viewed from the Z-axis direction. For example, the light passage opening 25 is a cavity (hole). Alternatively, a material having optical transparency with respect to the measurement light L0 and the laser light L10 may be disposed in the light passage opening 25.

The intermediate member 275 has a plate shape that extends along a plane perpendicular to the Z-axis direction, and extends in the Y-axis direction. The intermediate member 275 is disposed between the movable mirror 22 and the second link member 273 (in other words, between the movable mirror 22 and the light passage opening 25). The intermediate member 275 is connected to the movable mirror 22 through the non-linearity mitigation springs 278 as to be described later.

The pair of first torsion bars 276 respectively bridge the first end 271d of one lever 271 and the base 21, and the first end 271d of the other lever 271 and the base 21. That is, the pair of first torsion bars 276 are respectively connected between the pair of levers 271 and the base 21. The first torsion bars 276 extend in the Y-axis direction. The pair of first torsion bars 276 are disposed on the same central line parallel to the Y-axis direction. In this embodiment, the central line of the first torsion bars 276 and the central line of the first link member 272 are located on the same straight line. A protrusion 271f that protrudes outward in the Y-axis direction is provided in each of the first ends 271d of the levers 271, and each of the first torsion bars 276 is connected to the protrusion 271f.

The pair of second torsion bars 277 respectively bridge the second end 271e of one lever 271 and one end of the intermediate member 275, and the second end 271e of the other lever 271 and the other end of the intermediate member 275. That is, the pair of second torsion bars 277 are respectively connected between the pair of levers 271 and the movable mirror 22. The respective second torsion bars 277 extend in the Y-axis direction. The pair of second torsion bars 277 are disposed on the same central line parallel to the Y-axis direction.

The pair of non-linearity mitigation springs 278 are connected between the movable mirror 22 and the intermediate member 275. That is, the pair of non-linearity mitigation springs 278 are connected between the movable mirror 22 and the second torsion bar 277. Each of the non-linearity mitigation springs 278 includes a meandering portion 278a that extends in a meandering manner when viewed from the Z-axis direction. The meandering portion 278a includes a plurality of straight portions 278b which extend in the Y-axis direction and are aligned in the X-axis direction, and a plurality of folded portions 278c which alternately connect both ends of the plurality of straight portions 278b. One end of the meandering portion 278a is connected to the intermediate member 275, and the other end of the meandering portion 278a is connected to the frame portion 222. In the meandering portion 278a, a portion on the frame portion 222 side has a shape along the outer edge of the frame portion 222.

The non-linearity mitigation spring 278 is constituted as follows. In a state in which the movable mirror 22 has moved in the Z-axis direction, the amount of deformation of the non-linearity mitigation spring 278 around the Y-axis direction becomes smaller than the amount of deformation of each of the first torsion bar 276 and the second torsion bar 277 around the Y-axis direction, and the amount of deformation of the non-linearity mitigation spring 278 in the X-axis direction becomes larger than the amount of deformation of each of the first torsion bar 276 and the second torsion bar 277 in the X-axis direction. Accordingly, it is possible to suppress occurrence of non-linearity in twist deformation of the first torsion bar 276 and the second torsion bar 277, and it is possible to suppress deterioration of control characteristics of the movable mirror 22 due to the non-linearity.

The plurality of electrode support portions 279 includes a pair of first electrode support portions 279a, a pair of second electrode support portions 279b, and a pair of third electrode support portions 279c. Each of the electrode support portions 279a, 279b, and 279c has a plate shape that extends along a plane perpendicular to the Z-axis direction, and extends in the Y-axis direction. Each of the electrode support portions 279a, 279b, and 279c extends from the second portion 271b of the lever 271 toward a side opposite to the light passage opening 25. The pair of first electrode support portions 279a are disposed on the same central line parallel to the Y-axis direction. The pair of second electrode support portions 279b are disposed on the same central line parallel to the Y-axis direction. The pair of third electrode support portions 279c are disposed on the same central line parallel to the Y-axis direction. In the X-axis direction, the first electrode support portions 279a, the second electrode support portions 279b, and the third electrode support portions 279c are aligned in this order from the movable mirror 22 side.

The actuator unit 28 moves the movable mirror 22 in the Z-axis direction. The actuator unit 28 includes a fixed comb-tooth electrode 281, a movable comb-tooth electrode 282, a fixed comb-tooth electrode 283, and a movable comb-tooth electrode 284. Positions of the fixed comb-tooth electrodes 281 and 283 are fixed. The movable comb-tooth electrodes 282 and 284 move in accordance with movement of the movable mirror 22.

The fixed comb-tooth electrode 281 is provided on a part of a surface, which faces the electrode support portions 269, of the device layer 102 of the base 21. The fixed comb-tooth electrode 281 includes a plurality of fixed comb-teeth 281a which extend along a plane perpendicular to the Y-axis direction. The fixed comb-teeth 281a are aligned in the Y-axis direction with a predetermined gap therebetween.

The movable comb-tooth electrode 282 is provided on a surface of each of the first electrode support portions 269a on the movable mirror 22 side, on surfaces of each of the second electrode support portions 269b on both sides in the X-axis direction, and on a surface of each of the third electrode support portion 269c on the movable mirror 22 side. The movable comb-tooth electrode 282 includes a plurality of movable comb-teeth 282a which extend along a plane perpendicular to the Y-axis direction. The movable comb-teeth 282a are aligned in the Y-axis direction with a predetermined gap therebetween.

In the fixed comb-tooth electrode 281 and the movable comb-tooth electrode 282, the plurality of fixed comb-teeth 281a and the plurality of movable comb-teeth 282a are alternately arranged. That is, each of the fixed comb-teeth 281a of the fixed comb-tooth electrode 281 is located between the movable comb-teeth 282a of the movable comb-tooth electrode 282. The fixed comb-teeth 281a and the movable comb-teeth 282a, which are adjacent to each other, face each other in the Y-axis direction. A distance between the fixed comb-tooth 281a and the movable comb-tooth 282a, which are adjacent to each other, is approximately several μm.

The fixed comb-tooth electrode 283 is provided on a part of a surface, which faces the electrode support portions 279, of the device layer 102 of the base 21. The fixed comb-tooth electrode 283 includes a plurality of fixed comb-teeth 283a which extend along a plane perpendicular to the Y-axis direction. The fixed comb-teeth 283a are aligned in the Y-axis direction with a predetermined gap therebetween.

The movable comb-tooth electrode 284 is provided on a surface of each of the first electrode support portion 279a on the movable mirror 22 side, on surfaces of each of the second electrode support portions 279b on both sides in the X-axis direction, and on a surface of each of the third electrode support portion 279c on the movable mirror 22 side. The movable comb-tooth electrode 284 includes a plurality of movable comb-teeth 284a which extend along a plane perpendicular to the Y-axis direction. The movable comb-teeth 284a are aligned in the Y-axis direction with a predetermined gap therebetween.

In the fixed comb-tooth electrode 283 and the movable comb-tooth electrode 284, the plurality of fixed comb-teeth 283a and the plurality of movable comb-teeth 284a are alternately arranged. That is, each of the fixed comb-teeth 283a of the fixed comb-tooth electrode 283 is located between the movable comb-teeth 284a of the movable comb-tooth electrode 284. The fixed comb-teeth 283a and the movable comb-teeth 284a, which are adjacent to each other, face each other in the Y-axis direction. For example, a distance between the fixed comb-tooth 283a and the movable comb-tooth 284a, which are adjacent to each other, is approximately several sm.

The base 21 is provided with a plurality of electrode pads (first electrode pads) 211a, one electrode pad (first electrode pad) 212a, a plurality of electrode pads (second electrode pads) 211b, and one electrode pad (second electrode pad) 212b. The electrode pads 211a, 212a, 211b, and 212b are exposed to the first surface 21a side. The plurality of electrode pads 211a and the one electrode pad 212a are located on one side with respect to at least one of the movable mirror 22 and the drive unit 23 in a Y-axis direction (second direction along the first surface). The plurality of electrode pads 211b and the one electrode pad 212b are located on the other side with respect to at least one of the movable mirror 22 and the drive unit 23 in the Y-axis direction.

Each of the electrode pads 211a and 211b is disposed on a surface of a device layer 102 in an opening 213 formed in the first surface 21a of the base 21 up to the device layer 102. Several electrode pads among the electrode pads 211a and 211b are electrically connected to a fixed comb-tooth electrode 281 or a fixed comb-tooth electrode 283 through the device layer 102. Other several electrode pads among the electrode pads 211a and 211b are electrically connected to a movable comb-tooth electrode 282 or a movable comb-tooth electrode 284 through a first elastic support unit 26 or a second elastic support unit 27. The electrode pads 212a and 212b are provided in the base 21 as aground electrode. In this manner, the electrode pads 211a, 212a, 211b, and 212b are electrically connected to the drive unit 23.

In the mirror device 20 configured as described above, an electric signal for moving the movable mirror 22 along the Z-axis direction is input to the drive unit 23 through a lead pin 113 and a wire 15 to be described later. Accordingly, for example, an electrostatic force is generated between the fixed comb-tooth electrode 281 and the movable comb-tooth electrode 282 which face each other, and between the fixed comb-tooth electrode 283 and the movable comb-tooth electrode 284 which face each other so that the movable mirror 22 moves to one side in the Z-axis direction. At this time, first torsion bars 266 and 276 and second torsion bars 267 and 277 in the first elastic support unit 26 and the second elastic support unit 27 are twisted, and an elastic force is generated in the first elastic support unit 26 and the second elastic support unit 27. In the mirror device 20, when a periodic electric signal is applied to the drive unit 23, it is possible to reciprocate the movable mirror 22 in the Z-axis direction at a resonance frequency level. In this manner, the drive unit 23 functions as an electrostatic actuator.

Figure 4:
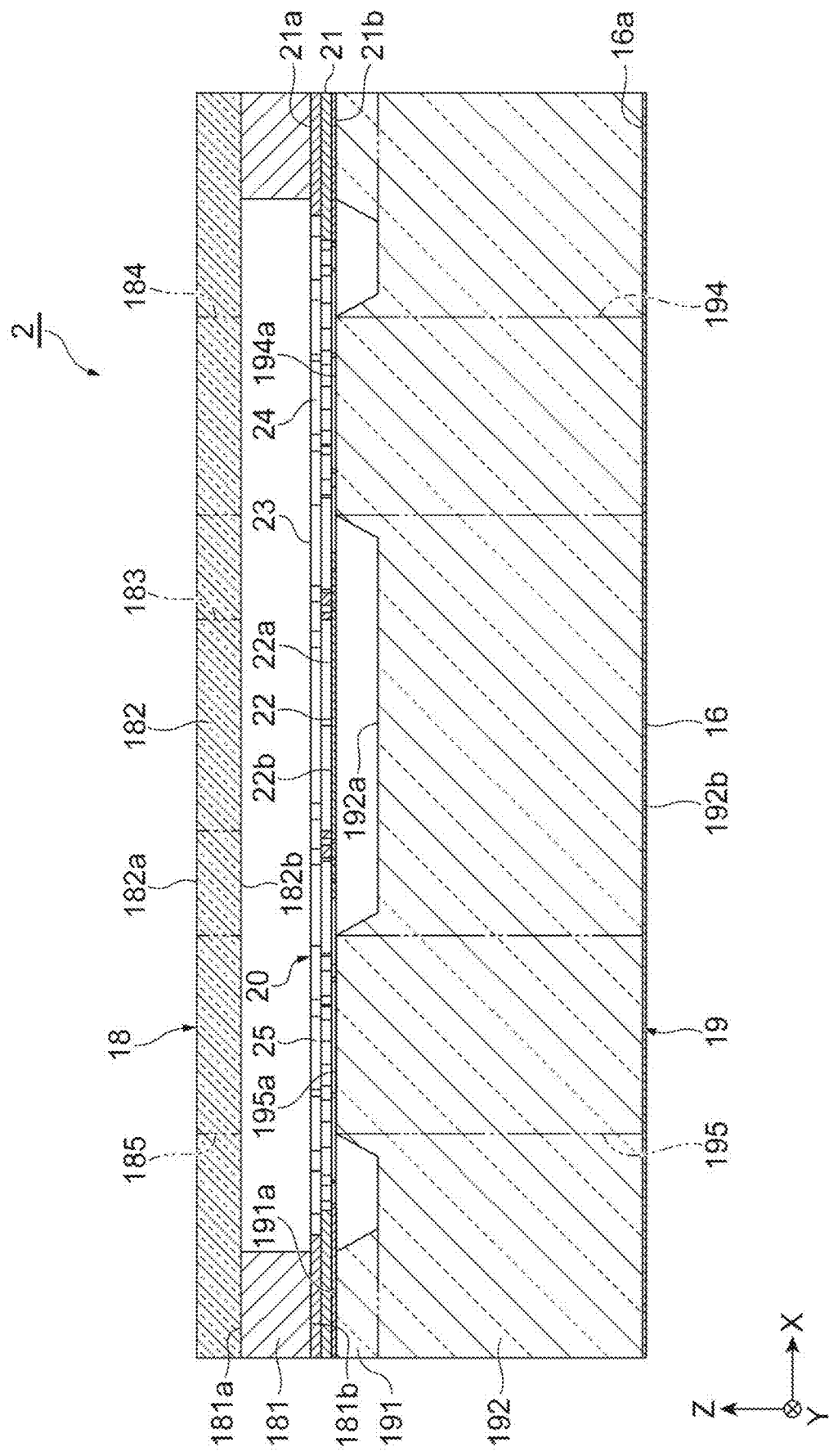
FIG. 4 is a cross-sectional view taken along line IV-IV in the mirror unit illustrated in FIG. 2.
Figure 6:
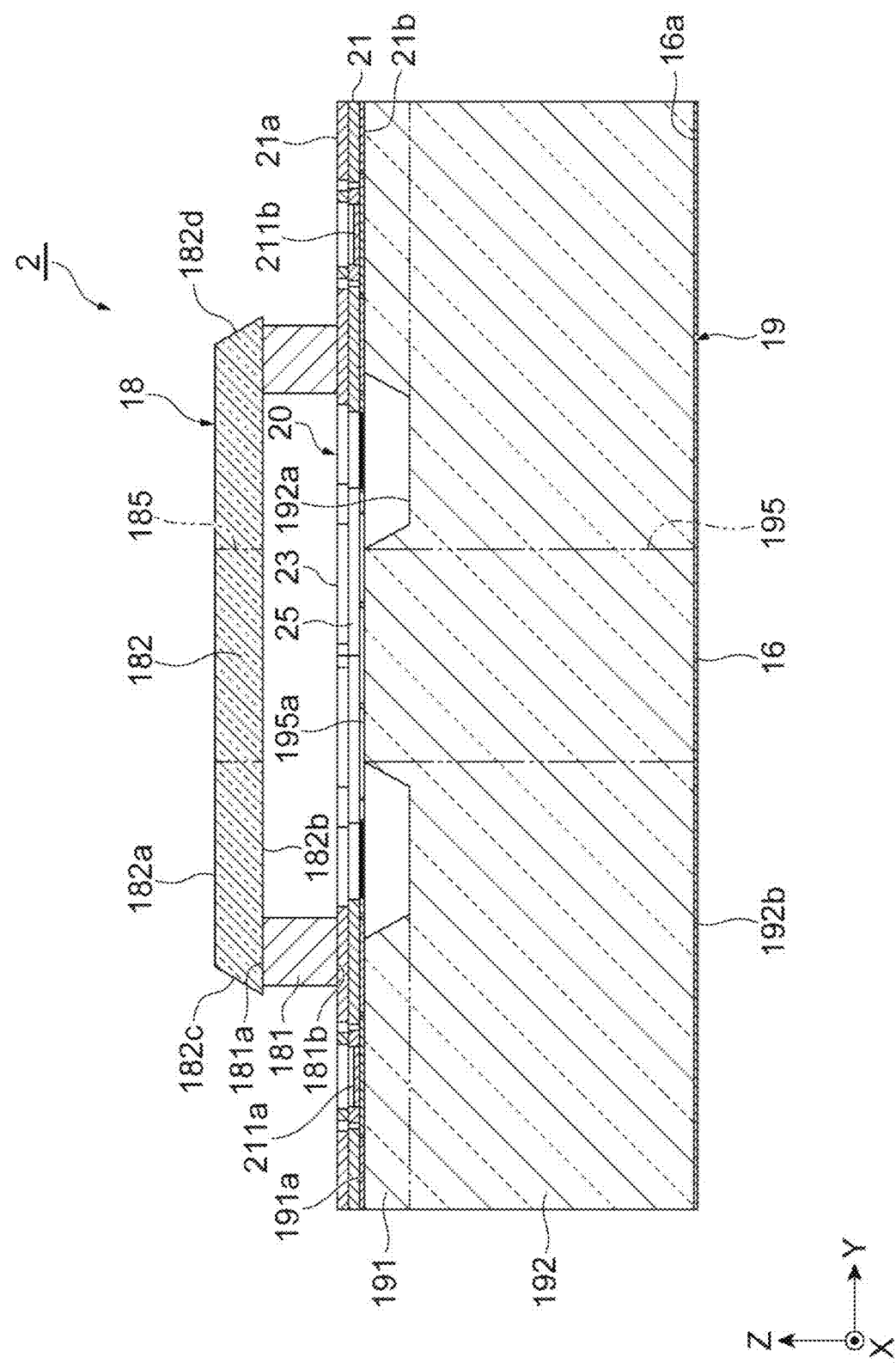
FIG. 6 is a cross-sectional view taken along line VI-VI in the mirror unit illustrated in FIG. 2.
Figure 7:
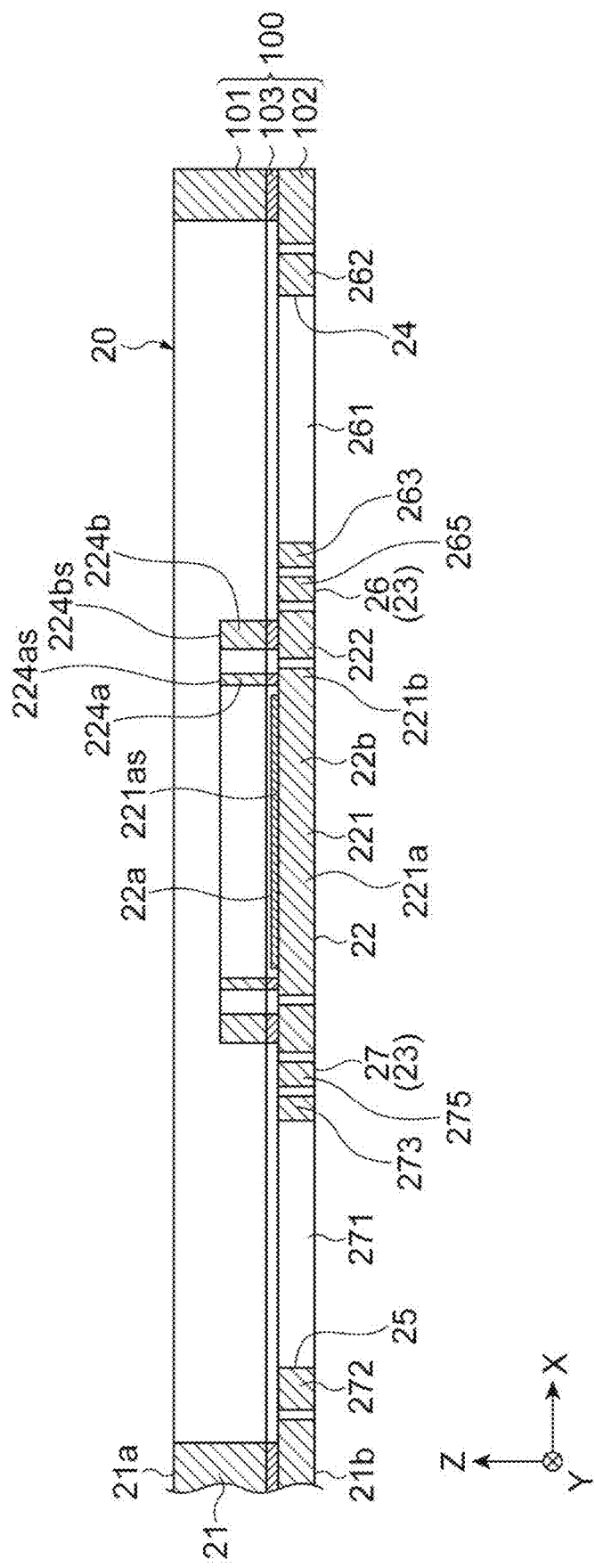
FIG. 7 is a schematic cross-sectional view taken along line IV-IV in the mirror device illustrated in FIG. 2.
Figure 8:
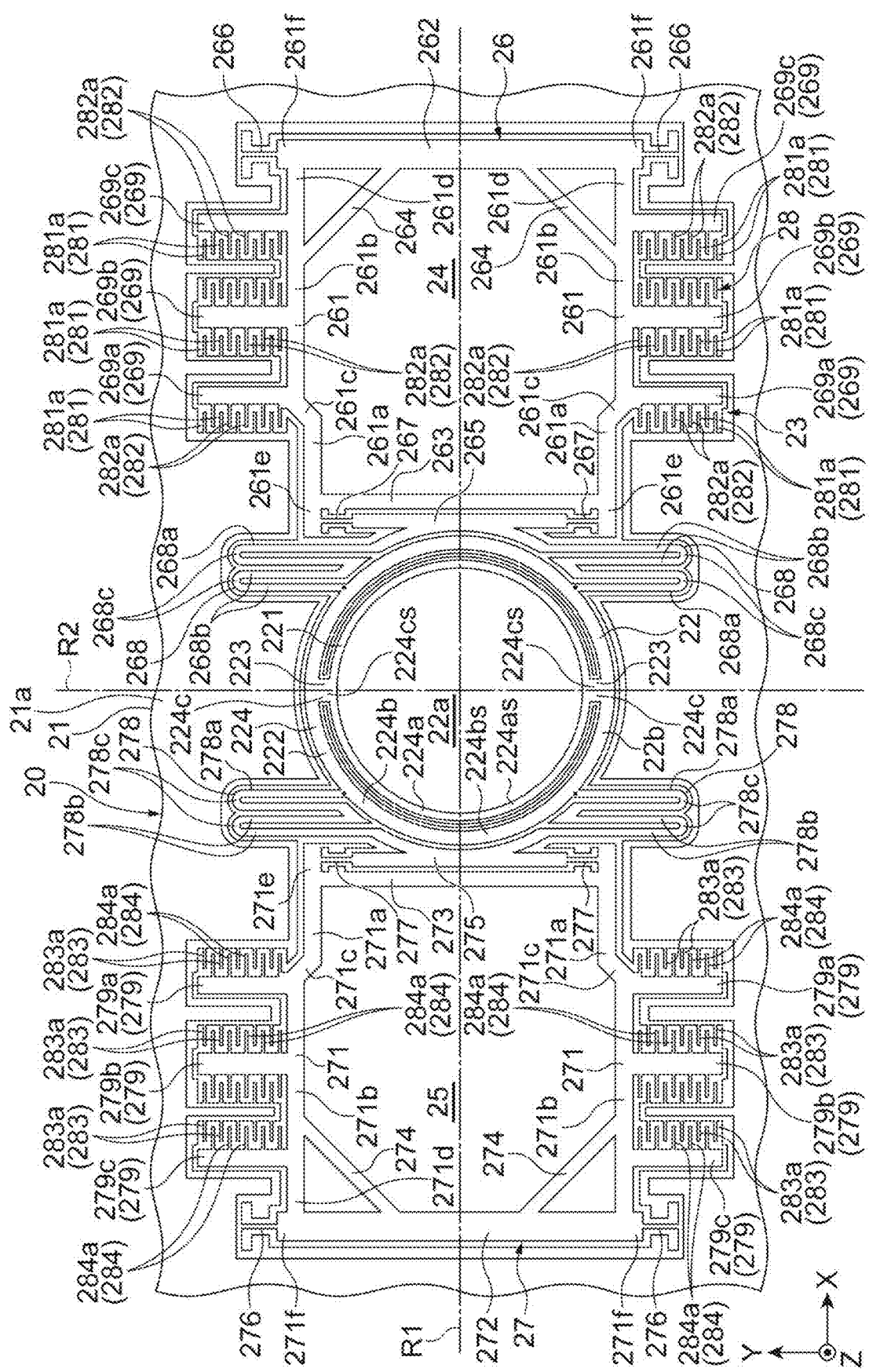
FIG. 8 is a partially enlarged view of the mirror device illustrated in FIG. 2.

As illustrated in FIG. 4, FIG. 5, and FIG. 6, the light incident/emission portion 18 includes a first joining portion 181 and a first main body portion 182. The first joining portion 181 and the first main body portion 182 are formed as separate bodies, and are connected to each other. For example, the first joining portion 181 is formed of silicon in a rectangular frame shape. For example, the first main body portion 182 is formed of glass in a rectangular plate shape.

The first joining portion 181 includes a surface 181a on a side opposite to the mirror device 20 and a surface 181b on the mirror device 20 side. As illustrated in FIG. 2, the surface 181b of the first joining portion 181 is joined to a region B1 (a hatched region in FIG. 2) in the first surface 21a of the base 21. For example, the region B1 has a rectangular ring shape. The region B1 includes a region B1a and a region B1b. The region B1a is a region that is located between the electrode pads 211a and 212a and at least one of the movable mirror 22 and the drive unit 23 in the first surface 21a. The region B1b is a region that is located between the electrode pads 211b and 212b and at least one of the movable mirror 22 and the drive unit 23 in the first surface 21a. The first joining portion 181 surrounds the movable mirror 22 and the drive unit 23 when viewed from the Z-axis direction. In FIG. 2, the first main body portion 182 is not illustrated.

As illustrated in FIG. 4, FIG. 5, and FIG. 6, in this embodiment, the surface 181b of the first joining portion 181 and the first surface 21a of the base 21 are joined to each other by direct bonding. Examples of the direct bonding include plasma activation bonding, surface-activated room-temperature bonding (SAB), atomic diffusion bonding (ADB), anodic bonding, fusion bonding, hydrophilic bonding, and the like.

The first main body portion 182 includes a surface 182a on a side opposite to the mirror device 20 and a surface 182b on the mirror device 20 side. The surface 182b of the first main body portion 182 is joined to the surface 181a of the first joining portion 181. In this embodiment, the surface 182b of the first main body portion 182 and the surface 181a of the first joining portion 181 are joined to each other by direct bonding.

The first main body portion 182 faces the movable mirror 22 and the drive unit 23 on one side in the Z-axis direction. The first main body portion 182 is provided with a light passage region 183 and a pair of light passage regions 184 and 185. The light passage regions 183, 184, and 185 are a part of the first main body portion 182 having a transmission property with respect to measurement light L0 and laser light L10. That is, the light passage regions 183, 184, and 185 are light transmission regions which are provided in the first main body portion 182. Anti-reflection (AR) coating (not illustrated) is performed to a region that faces the movable mirror 22 and the drive unit 23 (a region including the light passage regions 183, 184, and 185 when viewed from the Z-axis direction) in the surface 182b of the first main body portion 182.

The light passage region (first light passage region) 183 overlaps the mirror surface 22a of the movable mirror 22 when viewed from the Z-axis direction. The light passage region (second light passage region) 184 overlaps the light passage region 24 of the mirror device 20 and the mirror surface 16a of the fixed mirror 16 when viewed from the Z-axis direction. The light passage region 185 overlaps the light passage region 25 of the mirror device 20 and the mirror surface 16a of the fixed mirror 16 when viewed from the Z-axis direction. In the optical module 1A, the light passage region 185 does not function as a light passage region.

Figure 2:
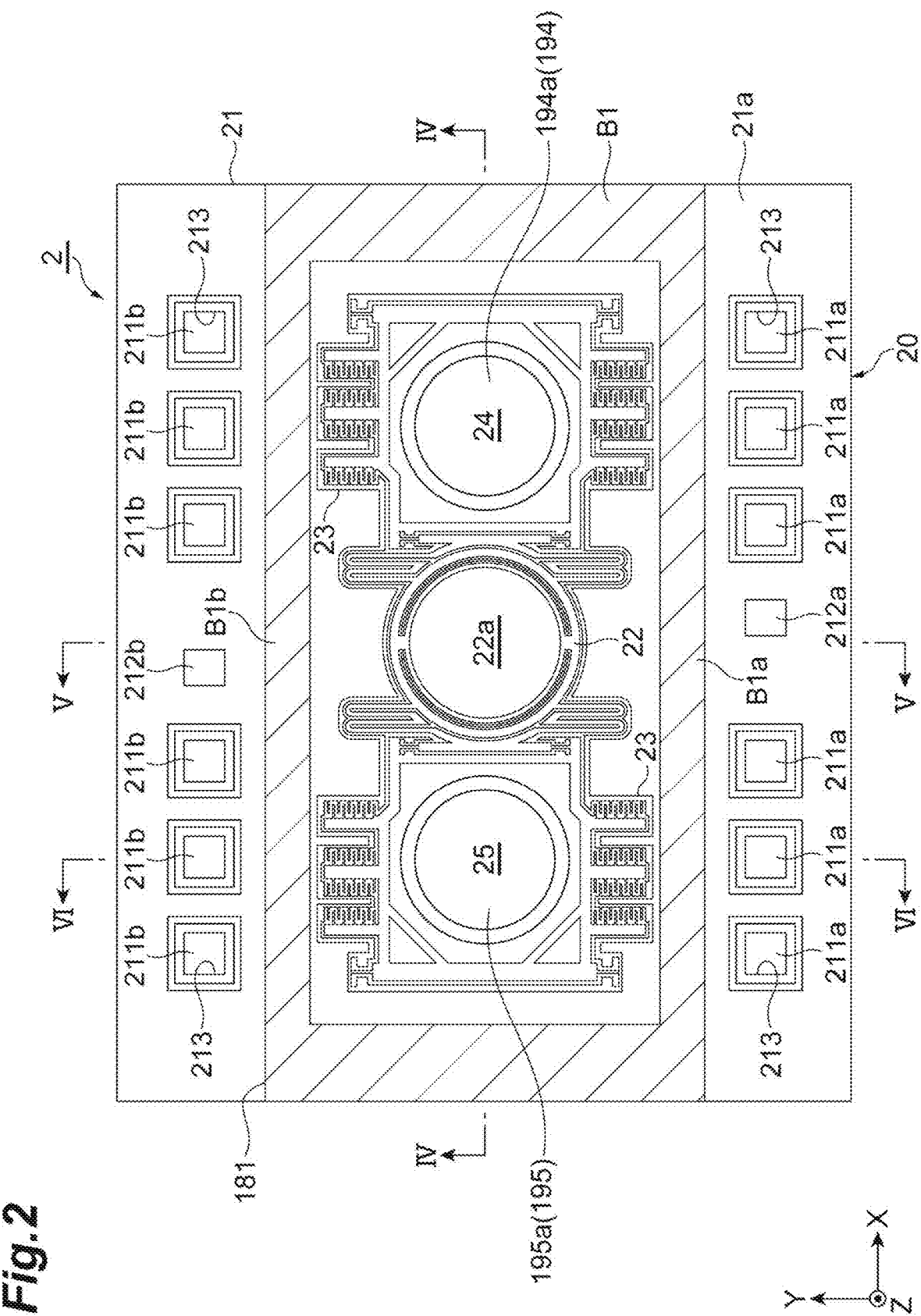
FIG. 2 is a plan view of a mirror unit illustrated in FIG. 1.
Figure 3:
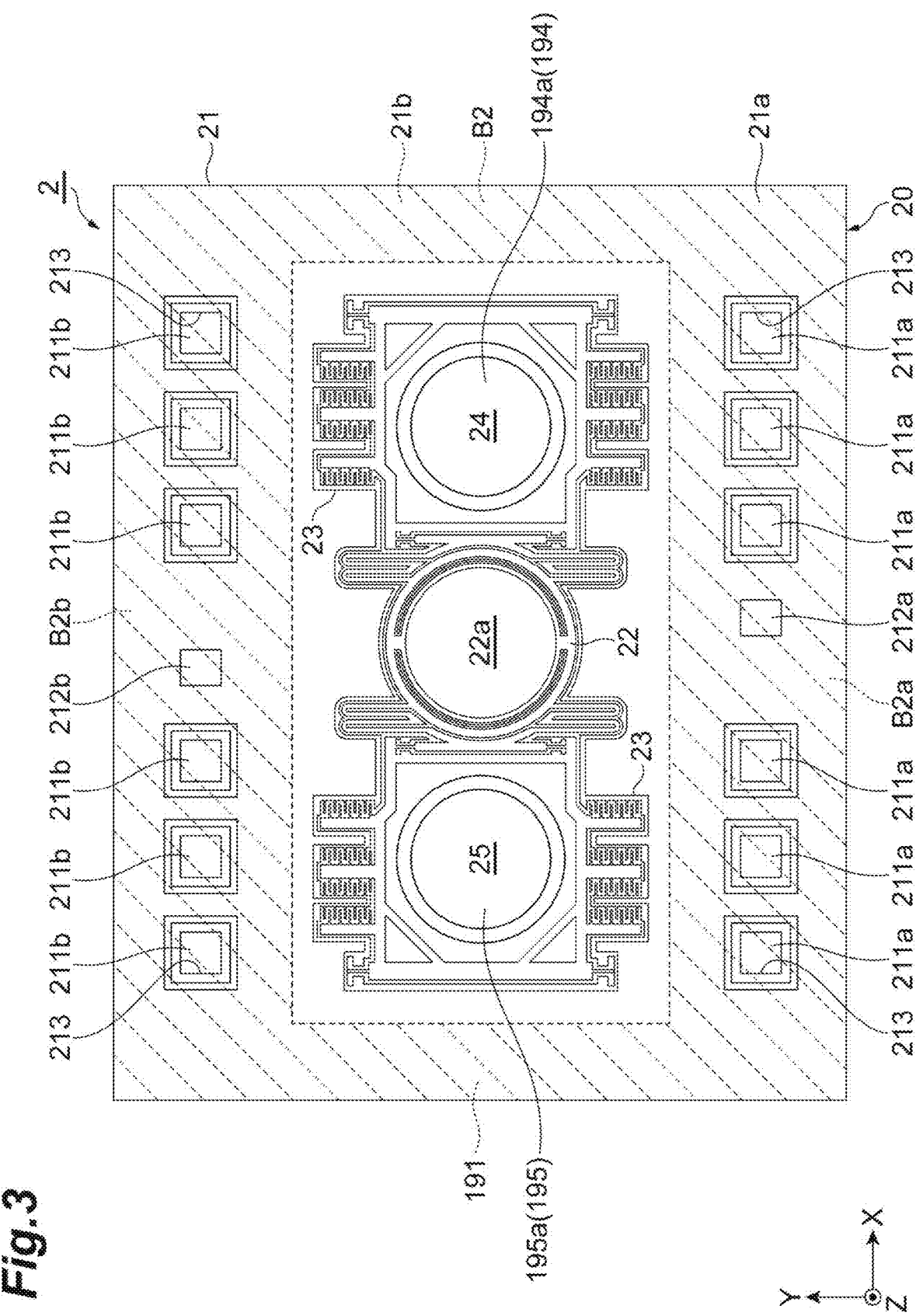
FIG. 3 is a plan view of the mirror unit illustrated in FIG. 1.

As illustrated in FIG. 2 and FIG. 6, the first joining portion 181 and the first main body portion 182 do not exist on one side of the electrode pads 211a and 212a in the Y-axis direction (that is, on a side opposite to at least one of the movable mirror 22 and the drive unit 23). Similarly, the first joining portion 181 and the first main body portion 182 do not exist on the other side of the electrode pads 211b and 212b in the Y-axis direction (that is, on a side opposite to at least one of the movable mirror 22 and the drive unit 23).

As illustrated in FIG. 6, the first main body portion 182 includes a first lateral surface 182c on the electrode pad 211a or 212a side in the Y-axis direction, and a second lateral surface 182d on the electrode pad 211b or 212b side in the Y-axis direction. The first lateral surface 182c includes a surface that is spaced away from the electrode pads 211a and 212a in the Y-axis direction as being spaced away from the electrode pads 211a and 212a in the Z-axis direction. The second lateral surface 182d includes a surface that is spaced away from the electrode pads 211b and 212b in the Y-axis direction as being spaced away from the electrode pads 211b and 212b in the Z-axis direction.

As illustrated in FIG. 4, FIG. 5, and FIG. 6, the support portion 19 includes a second joining portion 191 and a second main body portion 192. The second joining portion 191 and the second main body portion 192 are formed integrally with each other, and are connected to each other. For example, the second joining portion 191 and the second main body portion 192 are formed of glass in a rectangular plate shape.

The second joining portion 191 includes a surface 191a on the mirror device 20 side. As illustrated in FIG. 3, the surface 191a of the second joining portion 191 is joined to a region B2 (a hatched region in FIG. 3) in the second surface 21b of the base 21. For example, the region B2 has a rectangular ring shape. The region B2 includes a region B2a and a region B2b. The region B2a is a region that overlaps the electrode pads 211a and 212a when viewed from the Z-axis direction. The region B2b is a region that overlaps the electrode pads 211b and 212b when viewed from the Z-axis direction in the second surface 21b. The second joining portion 191 surrounds the movable mirror 22 and the drive unit 23 when viewed from the Z-axis direction in the second surface 21b. In FIG. 3, the light incident/emission portion 18 is not illustrated. In this embodiment, the surface 191a of the second joining portion 191 and the second surface 21b of the base 21 are joined to each other by direct bonding.

As illustrated in FIG. 4, FIG. 5, and FIG. 6, the second main body portion 192 includes a surface 192a on the mirror device 20 side, and a surface 192b on a side opposite to the mirror device 20. The surface 192a of the second main body portion 192 is spaced away from the mirror device 20 and is surrounded by the second joining portion 191 when viewed from the Z-axis direction. The second main body portion 192 faces the movable mirror 22 and the drive unit 23 on the other side in the Z-axis direction. The second main body portion 192 is provided with a pair of light passage regions 194 and 195. The light passage regions 194 and 195 are a part of the second main body portion 192 having a transmission property with respect to measurement light L0 and laser light L10. That is, the light passage regions 194 and 195 are light transmission regions which are provided in the second main body portion 192.

The light passage region (fourth light passage region) 194 overlaps the light passage region 184 of the first main body portion 182, the light passage region 24 of the mirror device 20, and the mirror surface 16a of the fixed mirror 16 when viewed from the Z-axis direction. The light passage region 195 overlaps the light passage region 185 of the first main body portion 182, the light passage region 25 of the mirror device 20, and the mirror surface 16a of the fixed mirror 16 when viewed from the Z-axis direction. A surface 194a of the light passage region 194 on the mirror device 20 side and a surface 195a of the light passage region 195 on the mirror device 20 side are located on the same plane as in the surface 191a of the second joining portion 191. The surface 194a of the light passage region 194 and the surface 195a of the light passage region 195 are subjected to AR coating (not illustrated). In the optical module 1A, the light passage region 195 does not function as a light passage region.

In this embodiment, a package that accommodates the movable mirror 22 and the drive unit 23 is constituted by the base 21 of the mirror device 20, the light incident/emission portion 18, and the support portion 19. That is, the mirror unit 2 constitutes a chip size package (CSP). The package air-tightly seals a space for accommodating the movable mirror 22 and the drive unit 23. The space is an evacuated space (a low-pressure space of which the degree of vacuum is raised) or a space in which a gas is substituted with an inert gas.

Here, the surface 182b of the first main body portion 182 and the surface 192a of the second main body portion 192 are spaced away from the movable mirror 22 and the drive unit 23. In addition, the surface 194a of the light passage region 194 faces the light passage region 24 that is a hole, and the surface 195a of the light passage region 195 faces the light passage region 25 that is a hole. Accordingly, in the mirror unit 2, when the movable mirror 22 reciprocates along the Z-axis direction, the movable mirror 22 and the drive unit 23 are prevented from coming into contact with the first main body portion 182 and the second main body portion 192.

A material of the first main body portion 182 of the light incident/emission portion 18 and the second main body portion 192 of the support portion 19 may be a material having a transmission property with respect to the measurement light L0 and the laser light L10. The material of the first main body portion 182 and the second main body portion 192 is selected in accordance with a sensitivity wavelength of the optical module 1A. Specifically, for example, glass is selected in a case where the sensitivity wavelength of the optical module 1A is a near infrared region, and silicon is selected in a case where the sensitivity wavelength of the optical module 1A is an intermediate infrared region.

The fixed mirror 16 is provided on the surface 192b of the second main body portion 192. A position of the fixed mirror 16 with respect to the base 21 of the mirror device 20 is fixed. For example, the fixed mirror 16 is formed on the surface 192b of the second main body portion 192 through vapor deposition. In this embodiment, the mirror surface 22a of the movable mirror 22 and the mirror surface 16a of the fixed mirror 16 face one side (beam splitter unit 3 side) in the Z-axis direction. The fixed mirror 16 is continuously formed on the surface 192b of the second main body portion 192 to reflect light that is transmitted from the light passage regions 194 and 195 of the second main body portion 192, but a fixed mirror that reflects light transmitted through the light passage region 194 and a fixed mirror that reflects light transmitted through the light passage region 195 may be provided separately from each other.

The mirror unit 2 configured as described above is attached to the surface 9a of the support 9 through the stress mitigation substrate 17 as illustrated in FIG. 1. For example, the stress mitigation substrate 17 is fixed to each of the mirror unit 2 (specifically, the fixed mirror 16), and the support 9 with an adhesive. A thermal expansion coefficient of the stress mitigation substrate 17 is closer to a thermal expansion coefficient of the base 21 of the mirror device 20 (more specifically, a thermal expansion coefficient of the support layer 10) in comparison to a thermal expansion coefficient of the support portion 19. In addition, the thickness of the stress mitigation substrate 17 is closer to the thickness of the base 21 of the mirror device 20 in comparison to the thickness of the support portion 19. For example, the stress mitigation substrate 17 is formed of silicon in a rectangular plate shape.

[Configuration of Wiring Structure and Beam Splitter Unit]

Figure 9:
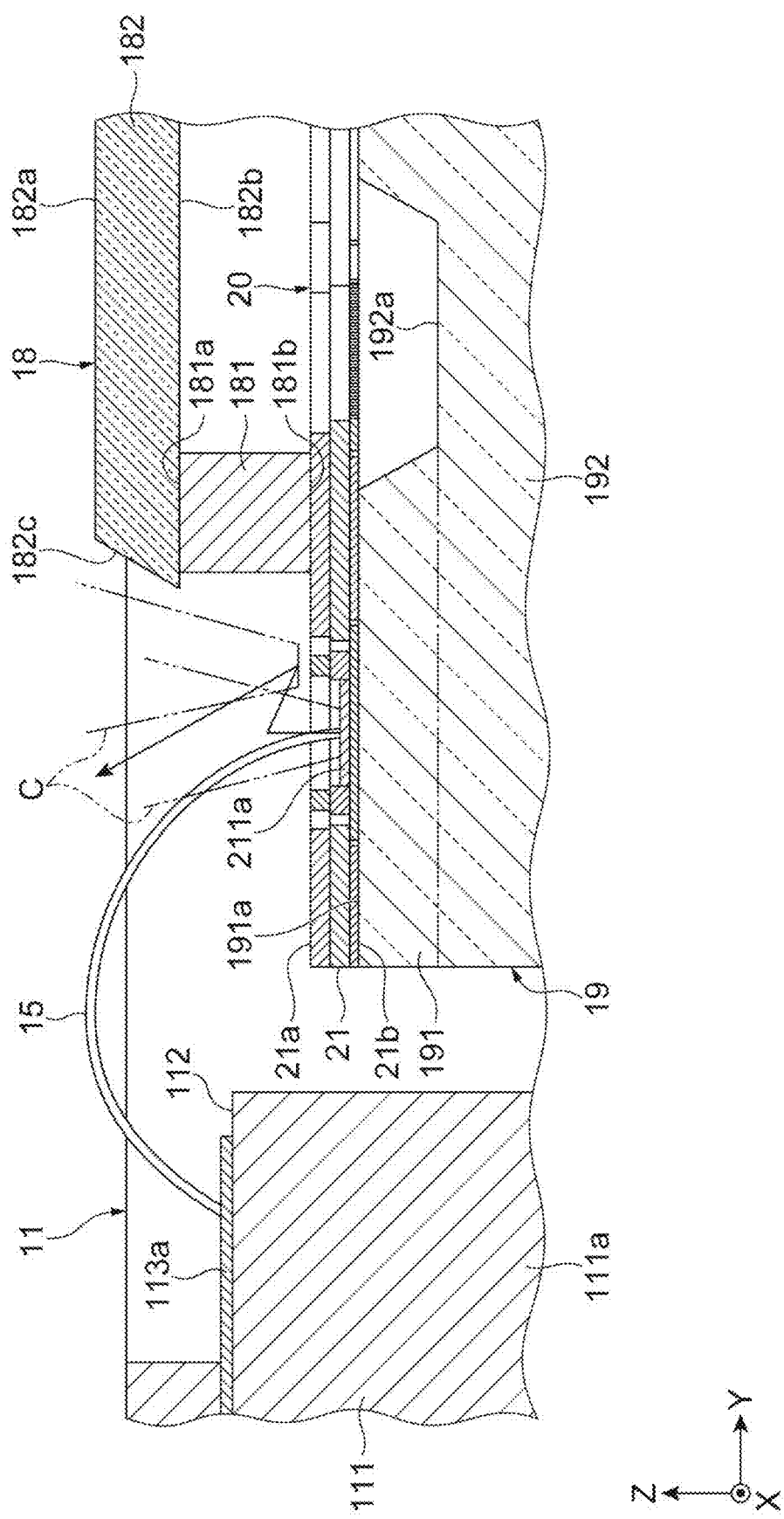
FIG. 9 is a partially enlarged view of the mirror unit illustrated in FIG. 6.

As illustrated in FIG. 1, the wiring structure 11 includes a frame body 111 and a plurality of lead pins 113. The frame body 111 surrounds the mirror unit 2 when viewed from the Z-axis direction. For example, the frame body 111 is formed of ceramic in a rectangular frame shape, and is attached to the surface 9a of the support 9 with an adhesive such as silver solder. The lead pins 113 are provided in the frame body 111 so that one ends are located inside the frame body 111 and the other ends are located outside the frame body 111. As illustrated in FIG. 9, a pair of side wall portions 111a, which face each other in the Y-axis direction, are provided with a stepped surface 112. One ends 113a of the plurality of lead pins 113 are disposed on the pair of stepped surfaces 112.

In the plurality of electrode pads 211a and the one electrode pad 212a which are located on one side in the Y-axis direction, and a plurality of the one ends 113a which are located on one side in the Y-axis direction, the one ends 113a are electrically connected to the electrode pads 211a or the electrode pad 212a which correspond to the one ends 113a by the wire 15. Similarly, in the plurality of electrode pads 211b and the one electrode 212b which are located on the other side in the Y-axis direction, and a plurality of the one ends 113a which are located on the other side in the Y-axis direction, the one ends 113a are electrically connected to the electrode pads 211b or the electrode pad 212b which correspond to the one ends 113a by a wire 15. In the optical module 1A, an electric signal for moving the movable mirror 22 along the Z-axis direction is input to the drive unit 23 through the plurality of lead pins 113 and a plurality of the wires 15.

Figure 10:
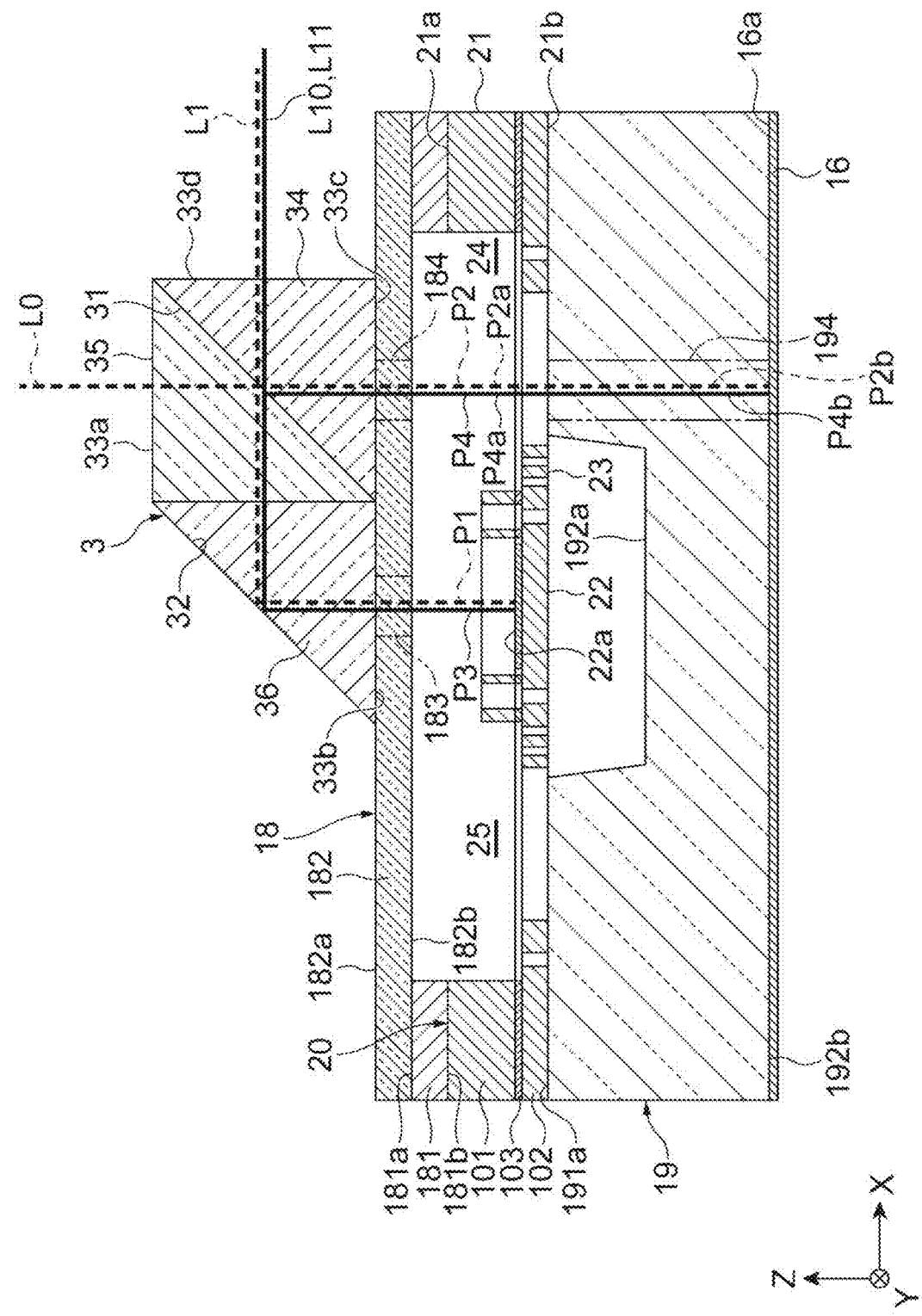
FIG. 10 is a schematic cross-sectional view of the mirror unit and a beam splitter unit illustrated in FIG. 1.

As illustrated in FIG. 10, the beam splitter unit 3 is attached to the surface 182a of the first main body portion 182, for example, by an optical adhesive that also functions as a refractive index matching agent. The beam splitter unit 3 includes a first mirror surface 31, a second mirror surface 32, and a plurality of optical surfaces 33a, 33b, 33c, and 33d. The beam splitter unit 3 is constituted by joining a plurality of optical blocks 34, 35, and 36. The optical blocks 34, 35, and 36 are formed of a material having a refractive index that is the same as or similar to that of the support portion 19. FIG. 10 is a schematic cross-sectional view of the mirror unit 2 and the beam splitter unit 3 illustrated in FIG. 1, and in FIG. 10, the mirror device 20 is schematically illustrated, for example, in a state in which dimensions in the Z-axis direction are enlarged in comparison to actual dimensions.

The first mirror surface 31 is a mirror surface (for example, a half mirror surface) that is inclined with respect to the Z-axis direction, and is formed between the optical block 34 and the optical block 35. In this embodiment, the first mirror surface 31 is a surface that is parallel to the Y-axis direction, has an angle of 45° with respect to the Z-axis direction, and is inclined to be spaced away from the light incident unit 4 as it approaches the mirror device 20. The first mirror surface 31 has a function of reflecting a part of the measurement light L0 and allowing the remainder of the measurement light L0 to be transmitted therethrough, and a function of reflecting a part of the laser light L10 and allowing the remainder of the laser light L10 to be transmitted therethrough. For example, the first mirror surface 31 is formed of a dielectric multi-layer film. The first mirror surface 31 overlaps the light passage region 24 of the mirror device 20, the light passage region 194 of the support portion 19, and the mirror surface 16a of the fixed mirror 16 when viewed from the Z-axis direction.

The second mirror surface 32 is a mirror surface (for example, a total reflection mirror surface) that is parallel to the first mirror surface 31, and is formed in the optical block 36 to be located on a side opposite to the light incident unit 4 with respect to the first mirror surface 31. The second mirror surface 32 has a function of reflecting the measurement light L0 and a function of reflecting the laser light L10. For example, the second mirror surface 32 is formed of a metal film. The second mirror surface 32 overlaps the mirror surface 22a of the movable mirror 22 of the mirror device 20 when viewed from the Z-axis direction, and overlaps the first mirror surface 31 when viewed from the X-axis direction.

The optical surface 33a is a surface perpendicular to the Z-axis direction, and is formed in the optical block 35 to be located on a side opposite to the mirror device 20 with respect to the first mirror surface 31. The optical surface 33b is a surface perpendicular to the Z-axis direction, and is formed in the optical block 36 to be located on the mirror device 20 side with respect to the second mirror surface 32. The optical surface 33c is a surface perpendicular to the Z-axis direction, and is formed in the optical block 34 to be located on the mirror device 20 side with respect to the first mirror surface 31. The optical surface 33b and the optical surface 33c are located on the same plane. The optical surface 33d is a surface perpendicular to the X-axis direction, and is formed in the optical block 34 to be located on the first mirror 51 side to be described later. The optical surfaces 33a, 33b, 33c, and 33d have a function of allowing the measurement light L0 to be transmitted therethrough and a function of allowing the laser light L10 to be transmitted therethrough.

Here, an optical path of the measurement light L0 and an optical path of the laser light L10 in the mirror unit 2 and the beam splitter unit 3 will be described in detail with reference to FIG. 10.

As illustrated in FIG. 10, when the measurement light L0 is incident to the beam splitter unit 3 through the optical surface 33a along the Z-axis direction, a part of the measurement light L0 is reflected by the first mirror surface 31 and the second mirror surface 32, and reaches the mirror surface 22a of the movable mirror 22 through the optical surface 33b and the light passage region 183 of the first main body portion 182. The part of the measurement light L0 is reflected by the mirror surface 22a of the movable mirror 22, proceeds along the same optical path P1 in an opposite direction, and is transmitted through the first mirror surface 31. The remainder of the measurement light L0 is transmitted through the first mirror surface 31, and reaches the mirror surface 16a of the fixed mirror 16 through the light passage region 184 of the first main body portion 182, the light passage region 24 of the mirror device 20, and the light passage region 194 of the support portion 19. The remainder of the measurement light L0 is reflected by the mirror surface 16a of the fixed mirror 16, proceeds along the same optical path P2 in an opposite direction, and is reflected by the first mirror surface 31. The part of the measurement light L0 which is transmitted through the first mirror surface 31, and the remainder of the measurement light L0 which is reflected by the first mirror surface 31 become interference light L1, and the interference light L1 of the measurement light is emitted from the beam splitter unit 3 through the optical surface 33d along the X-axis direction.

On the other hand, when the laser light L10 is incident to the beam splitter unit 3 through the optical surface 33d along the X-axis direction, a part of the laser light L10 is transmitted through the first mirror surface 31, is reflected by the second mirror surface 32, and reaches the mirror surface 22a of the movable mirror 22 through the optical surface 33b and the light passage region 183 of the first main body portion 182. The part of the laser light L10 is reflected by the mirror surface 22a of the movable mirror 22, proceeds along the same optical path P3 in an opposite direction, and is transmitted through the first mirror surface 31. The remainder of the laser light L10 is reflected by the first mirror surface 31, and reaches the mirror surface 16a of the fixed mirror 16 through the optical surface 33c, the light passage region 184 of the first main body portion 182, the light passage region 24 of the mirror device 20, and the light passage region 194 of the support portion 19. The remainder of the laser light L10 is reflected by the mirror surface 16a of the fixed mirror 16, proceeds on the same optical path P4 in an opposite direction, and is reflected by the first mirror surface 31. The part of the laser light L10 which is transmitted through the first mirror surface 31, and the remainder of the laser light L10 which is reflected by the first mirror surface 31 become interference light L1l, and the interference light L11 of the laser light is emitted from the beam splitter unit 3 through the optical surface 33d along the X-axis direction.

As described above, the light passage region 24 of the mirror device 20 constitutes a first portion P2a of the optical path P2 of the measurement light L0 and a first portion P4a of the optical path P4 of the laser light L10 in an optical path between the beam splitter unit 3 and the fixed mirror 16. In addition, the light passage region 194 of the support portion 19 constitutes a second portion P2b of the optical path P2 of the measurement light L0 and a second portion P4b of the optical path P4 of the laser light L10 in an optical path between the beam splitter unit 3 and the fixed mirror 16.

The second portion P2b of the optical path P2 of the measurement light L0 is constituted by the light passage region 194, and thus an optical path difference between the optical paths P1 and P2 is corrected so that a difference between an optical path length (an optical path length in consideration of a refractive index of respective media through which the optical path passes) of the optical path P1 of the measurement light L0 and an optical path length of the optical path P2 of the measurement light L0 decreases. Similarly, the second portion P4b of the optical path P4 of the laser light L10 is constituted by the light passage region 194, and thus an optical path difference between the optical paths P3 and P4 is corrected so that a difference between an optical path length of the optical path P3 of the laser light L10 and an optical path length of the optical path P4 of the laser light L10 decreases. In this embodiment, a refractive index of the light passage region 194 is equal to a refractive index of the optical blocks 34, 35, and 36 which constitute the beam splitter unit 3, and a distance between the first mirror surface 31 and the second mirror surface 32 along the X-axis direction is equal to the thickness of the light passage region 194 along the Z-axis direction (a distance between the surface 194a of the light passage region 194 and the surface 192b of the support portion 19 along the Z-axis direction).

[Configuration of Support Structure, Light Incident Unit, and the Like]

As illustrated in FIG. 1, the support structure 12 includes a main body portion 140. The main body portion 140 includes a pair of side wall portions 141 and 142, a ceiling wall portion 143, and an extension portion 144. For example, the main body portion 140 is integrally formed of a metal. The main body portion 140 is provided with a plurality of positioning pins 121a. The main body portion 140 is positioned with respect to the support 9 by inserting the positioning pins 121a into reference holes 9b and 9c formed in the support 9, and in this state, the main body portion 140 is attached to the support 9, for example, by a bolt.

The pair of side wall portions 141 and 142 face each other in the X-axis direction. An opening 141a is formed in the side wall portion 141 on one side in the X-axis direction. The ceiling wall portion 143 faces the support 9 in the Z-axis direction. An opening 143a is formed in the ceiling wall portion 143. The extension portion 144 extends from the side wall portion 141 to one side in the X-axis direction. A first through-hole 144a, a second through-hole 144b, and a third through-hole 144c are formed in the extension portion 144. The first through-hole 144a, the second through-hole 144b, and the third through-hole 144c pass through the extension portion 144 along the Z-axis direction. The second through-hole 144b is formed on one side of the first through-hole 144a in the X-axis direction. The third through-hole 144c is formed on one side of the second through-hole 144b in the X-axis direction.

The light incident unit 4 is disposed in the opening 143a of the ceiling wall portion 143. The light incident unit 4 includes a holder 41, a collimator lens 42, and a filter 43. The holder 41 is provided with an aperture 44. Measurement light L0 incident from the first light source through a measurement target or measurement light L0 that occurs from the measurement target is incident to the aperture 44. The filter 43 is disposed on the light incident unit 4 side with respect to the beam splitter unit 3, and is attached to the holder 41 to close the aperture 44 on a light emission side of the aperture 44. The filter 43 has a function of allowing the measurement light L0 to be transmitted therethrough and cutting off the laser light L10. For example, the filter 43 is formed of silicon in a plate shape. In this embodiment, the filter 54 has a function of allowing the measurement light L0 to be transmitted therethrough and absorbing the laser light L10. In this embodiment, the filter 54 has the function of absorbing the laser light L10 as a function of cutting off the laser light L10, but may have a function of reflecting the laser light L10, for example, to the outside of the interference optical system as the function of cutting off the laser light 10. Accordingly, it is possible to prevent light of sensitivity wavelength component of the second light detector 8 from being incident to the beam splitter unit 3 from the light incident unit 4. The collimator lens 42 is held by the holder 41. The collimator lens 42 collimates the measurement light L0 transmitted through the filter 43. The holder 41 is fixed to the ceiling wall portion 143 in the opening 143a.

The first light detector 6 is disposed in the first through-hole 144a. The first light detector 6 includes a light detection element 62, a package 64 including a light transmission window 64a, a holder 61, a condensing lens 63, and a plurality of lead pins 65. The package 64 accommodates the light detection element 62. The light detection element 62 detects the interference light L1 of the measurement light. For example, the light detection element 62 is an InGaAs photodiode. The holder 61 holds the package 64 and the condensing lens 63. The condensing lens 63 condenses the interference light L1 of the measurement light which is incident to the light detection element 62 through the light transmission window 64a to the light detection element 62. An optical axis of the light detection element 62 and an optical axis of the condensing lens 63 match each other.

The holder 61 is fixed to the extension portion 144 in the first through-hole 144a. In this manner, the first light detector 6 is disposed on one side of the mirror unit 2 in the X-axis direction to face one side in the Z-axis direction, and is supported by the support structure 12. The first light detector 6 detects the interference light L1 of the measurement light which is emitted from the beam splitter unit 3.

The second light detector 8 is disposed in the second through-hole 144b. The second light detector 8 includes a light detection element 82, a package 84 including a condensing lens 84a, and a plurality of lead pins 85. The light detection element 82 detects the interference light L11 of the laser light. For example, the light detection element 82 is a Si photodiode. The condensing lens 84a condenses the interference light L11 of the laser light which is incident to the light detection element 82 to the light detection element 82. An optical axis of the light detection element 82 and an optical axis of the condensing lens 84a match each other.

The package 84 is fixed to the extension portion 144 in the second through-hole 144b. In this manner, the second light detector 8 is disposed on one side of the first light detector 6 in the X-axis direction to face the same side as in the first light detector 6, and is supported by the support structure 12. The second light detector 8 detects the interference light L11 of the laser light which is emitted from the beam splitter unit 3.

The second light source 7 is disposed in the third through-hole 144c. The second light source 7 includes a light-emitting element 72, a package 74 including a collimator lens 74a, and a plurality of lead pins 75. The light-emitting element 72 emits the laser light L10. For example, the light-emitting element 72 is a semiconductor laser such as VCSEL. The collimator lens 74a collimates the laser light L10 emitted from the light-emitting element 72. An optical axis of the light-emitting element 72 and an optical axis of the collimator lens 74a match each other.

The package 74 is fixed to the extension portion 144 in the third through-hole 144c. In this manner, the second light source 7 is disposed on one side of the second light detector 8 in the X-axis direction to face the same side as in the first light detector 6, and is supported by the support structure 12. The second light source 7 emits the laser light L10 to be incident to the beam splitter unit 3.

As described above, the main body portion 140 (more specifically, the extension portion 144) of the support structure 12 holds the first light detector 6, the second light detector 8, and the second light source 7 so that the first light detector 6, the second light detector 8, and the second light source 7 face the same side are aligned in the order of the first light detector 6, the second light detector 8, and the second light source 7. In this embodiment, the main body portion 140 holds the first light detector 6, the second light detector 8, and the second light source 7 so that the first light detector 6, the second light detector 8, and the second light source 7 face one side in the Z-axis direction on one side of the mirror unit 2 in the X-axis direction. In addition, the main body portion 140 holds the first light detector 6, the second light detector 8, and the second light source 7 to be aligned in the order of the first light detector 6, the second light detector 8, and the second light source 7 from the other side (that is, the mirror unit 2 side) in the X-axis direction.

A configuration in which the first light detector 6 faces an arbitrary side represents that a light-receiving surface of the light detection element 62 faces the arbitrary side (that is, the first light detector 6 is disposed to detect light incident from the arbitrary side). In this case, for example, a lead pin of the light detection element 62 extends to a side opposite to the arbitrary side. Similarly, a configuration in which the second light detector 8 faces an arbitrary side represents that alight-receiving surface of the light detection element 82 faces the arbitrary side (that is, the second light detector 8 is disposed to detect light incident from the arbitrary side). In this case, for example, a lead pin of the light detection element 82 extends to a side opposite to the arbitrary side. In addition, a configuration in which the second light source 7 faces an arbitrary side represents that a light emission surface of the light-emitting element 72 faces the arbitrary side (that is, the second light source 7 is disposed to emit light to the arbitrary side). In this case, for example, a lead pin of the light-emitting element 72 extends to a side opposite to the arbitrary side.

A first mirror 51, a second mirror 52, and a third mirror 53 are attached to the extension portion 144. The first mirror 51 is attached to the extension portion 144 to be located on one side of the first light detector 6 in the Z-axis direction. The second mirror 52 is attached to the extension portion 144 to be located on one side of the second light detector 8 in the Z-axis direction. The third mirror 53 is attached to the extension portion 144 to be located on one side of the second light source 7 in the Z-axis direction.

The first mirror 51 is a dichroic mirror that has a function of reflecting the measurement light L0 and allowing the laser light L10 to be transmitted therethrough, and is inclined with respect to an optical axis of the first light detector 6. The first mirror 51 is disposed to overlap the beam splitter unit 3 through the opening 141a of the side wall portion 141 when viewed from the X-axis direction and to overlap the first light detector 6 when viewed from the Z-axis direction. In this embodiment, an optical surface of the first mirror 51 is a surface that is parallel to the Y-axis direction and has an angle of 45° with respect to the Z-axis direction. The optical axis of the first light detector 6 is parallel to the Z-axis direction.

The second mirror 52 is a mirror (for example, a half mirror) that has a function of reflecting a part of the laser light L10 and allowing the remainder of the laser light L10 to be transmitted therethrough, and is parallel to the first mirror 51. The second mirror 52 is disposed to overlap the first mirror 51 when viewed from the X-axis direction, and to overlap the second light detector 8 when viewed from the Z-axis direction. In this embodiment, an optical surface of the second mirror 52 is a surface that is parallel to the Y-axis direction and has an angle of 45° with respect to the Z-axis direction.

The third mirror 53 is a mirror (for example, a total reflection mirror) that has a function of reflecting the laser light L10 and is parallel to the second mirror 52. The third mirror 53 is disposed to overlap the second mirror 52 when viewed from the X-axis direction, and to overlap the second light source 7 when viewed from the Z-axis direction. In this embodiment, an optical surface of the third mirror 53 is a surface that is parallel to the Y-axis direction and has an angle of 45° with respect to the Z-axis direction.

A filter 56 is disposed between the first mirror 51 and the first light detector 6. In this embodiment, the filter 56 is held by the holder 61 of the first light detector 6. The filter 56 has a function of allowing the measurement light L0 to be transmitted therethrough and cutting off the laser light L10. For example, the filter 56 is a silicon plate in which an anti-reflection film is formed on a light incident surface. As described above, the filter 56 is a member different from a member in which the first mirror 51 is formed on a surface (surface facing the beam splitter unit 3) on the beam splitter unit 3 side. In this embodiment, the filter 56 has a function of allowing the measurement light L0 to be transmitted therethrough and absorbing the laser light L10. In this embodiment, the filter 56 has the function of absorbing the laser light L10 as the function of cutting off the laser light L10, but may have a function of reflecting the laser light L10, for example, to the outside of the interference optical system as the function of cutting off the laser light L10.

A return light suppressing unit 57 is disposed on a side opposite to the second light detector 8 with respect to the second mirror 52. The return light suppressing unit 57 has a function suppressing incident laser light L10 from becoming return light (that is, a function of suppressing the laser light L10 from being reflected to conform to an optical path of the incident laser light L10). In this embodiment, the return light suppressing unit 57 has a function of absorbing the incident laser light L10. In this embodiment, the return light suppressing unit 57 is a part of the support structure 12 that supports the second mirror 52. More specifically, the return light suppressing unit 57 is a part of the extension portion 144. The return light suppressing unit 57 is constituted by forming a black resist layer on the portion, or by performing a black almite treatment to the portion. In this embodiment, the return light suppressing unit 57 is a part of the support structure 12, and thus an increase in the number of parts is suppressed. In this embodiment, the return light suppressing unit 57 has the function of absorbing the incident laser light L10 as the function of suppressing the incident laser light L10 from becoming return light, but may have a function of reflecting the incident laser light L10, for example, to the outside of the interference optical system as the function of suppressing the incident laser light L10 from becoming return light.

The main body portion 140 of the support structure 12 is fixed to a wiring substrate 500 by a bolt or the like. The plurality of lead pins 113 of the wiring structure 11, the plurality of lead pins 65 of the first light detector 6, the plurality of lead pins 85 of the second light detector 8, and the plurality of lead pins 75 of the second light source 7 are electrically or physically connected to wires of the wiring substrate 500. The wiring substrate 500 is provided with a connector 501 that electrically connects the optical module 1A to an external device.

Here, description will be given of an optical path between the beam splitter unit 3 and the first light detector 6, and the like. Interference light L1 of the measurement light which is emitted from the beam splitter unit 3 along the X-axis direction is reflected by the first mirror 51, and is incident to the first light detector 6 through the filter 56 and is detected by the first light detector 6. On the other hand, the laser light L10 emitted from the second light source 7 is reflected by the third mirror 53, is transmitted through the second mirror 52 and the first mirror 51, and is incident to the beam splitter unit 3 along the X-axis direction. Interference light L1 of the laser light which is emitted from the beam splitter unit 3 along the X-axis direction is transmitted through the first mirror 51, is reflected by the second mirror 52, and is incident to the second light detector 8 and is detected by the second light detector 8. On the other hand, a part of the laser light L10 reflected by the second mirror 52 is suppressed from becoming return light due to the return light suppressing unit 57.

In the optical module 1A, a length of the optical path between the beam splitter unit 3 and the first light detector 6 is shorter than a length of an optical path between the beam splitter unit 3 and the second light detector 8, and is shorter than a length of an optical path between the beam splitter unit 3 and the second light source 7. The lengths of the optical paths represent physical distances along the optical paths.

Specifically, a distance from an intersection between an optical path and the first mirror surface 31 of the beam splitter unit 3 to a light incident surface of the first light detector 6 is shorter than a distance from an intersection between an optical path and the first mirror surface 31 of the beam splitter unit 3 to a light incident surface of the second light detector 8, and is shorter than a distance from an intersection between an optical path and the first mirror surface 31 of the beam splitter unit 3 to a light emission surface of the second light source 7. A distance from an intersection between an optical path and the first mirror surface 31 of the beam splitter unit 3 to a light incident surface of the condensing lens 63 of the first light detector 6 is shorter than a distance from an intersection between an optical path and the first mirror surface 31 of the beam splitter unit 3 to a light incident surface of the condensing lens 84*a* of the second light detector 8, and is shorter than a distance from an intersection between an optical path and the first mirror surface 31 of the beam splitter unit 3 to a light emission surface of the collimator lens 74*a* of the second light source 7. A distance from the optical surface 33*d* of the beam splitter unit 3 to the light incident surface of the first light detector 6 is shorter than a distance from the optical surface 33*d* of the beam splitter unit 3 to the light incident surface of the second light detector 8, and is shorter than a distance from the optical surface 33*d* of the beam splitter unit 3 to the light emission surface of the second light source 7. A distance from the optical surface 33*d* of the beam splitter unit 3 to the light incident surface of the condensing lens 63 of the first light detector 6 is shorter than a distance from optical surface 33*d* of the beam splitter unit 3 to the light incident surface of the condensing lens 84*a* of the second light detector 8, and is shorter than a distance from the optical surface 33*d* of the beam splitter unit 3 to the light emission surface of the collimator lens 74*a* of the second light source 7.

[Method for Manufacturing Mirror Unit]

Figure 11A:
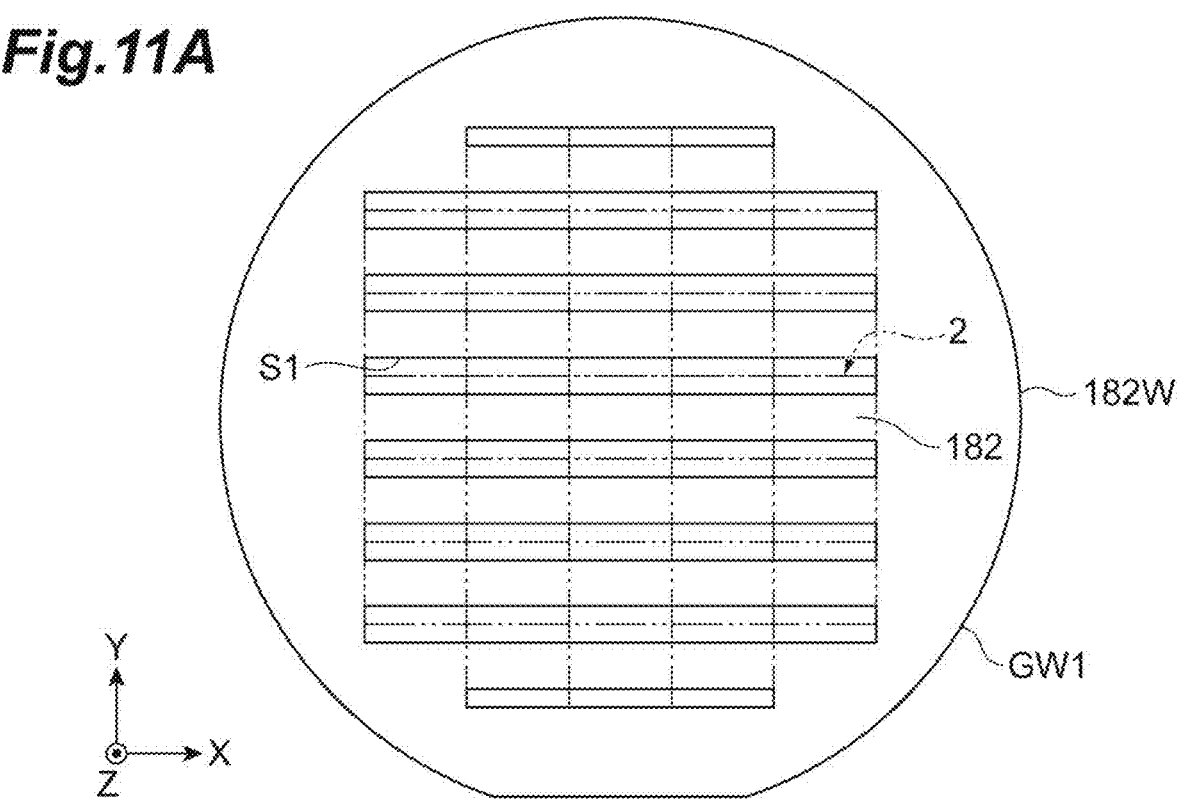
FIG. 11A and FIG. 11B are views illustrating a manufacturing process of the mirror unit illustrated in FIG. 2.

A method for manufacturing the above-described mirror unit 2 will be described. First, as illustrated in FIG. 11A, a wafer (fourth waver) 182W including a plurality of the first main body portions 182 (portions which are to be the first main body portion 182 in the mirror unit 2) is prepared (first process). In the wafer 182W, first main body portions 182 adjacent to each other in the X-axis direction are continuous to each other, and first main body portions 182 adjacent to each other in the Y-axis direction are spaced away from each other through a slit (opening) S1 that extends in the X-axis direction. For example, the wafer 182W including the plurality of first main body portions 182 are obtained by sandblasting a glass wafer (first glass wafer) GW1.

Figure 11B:
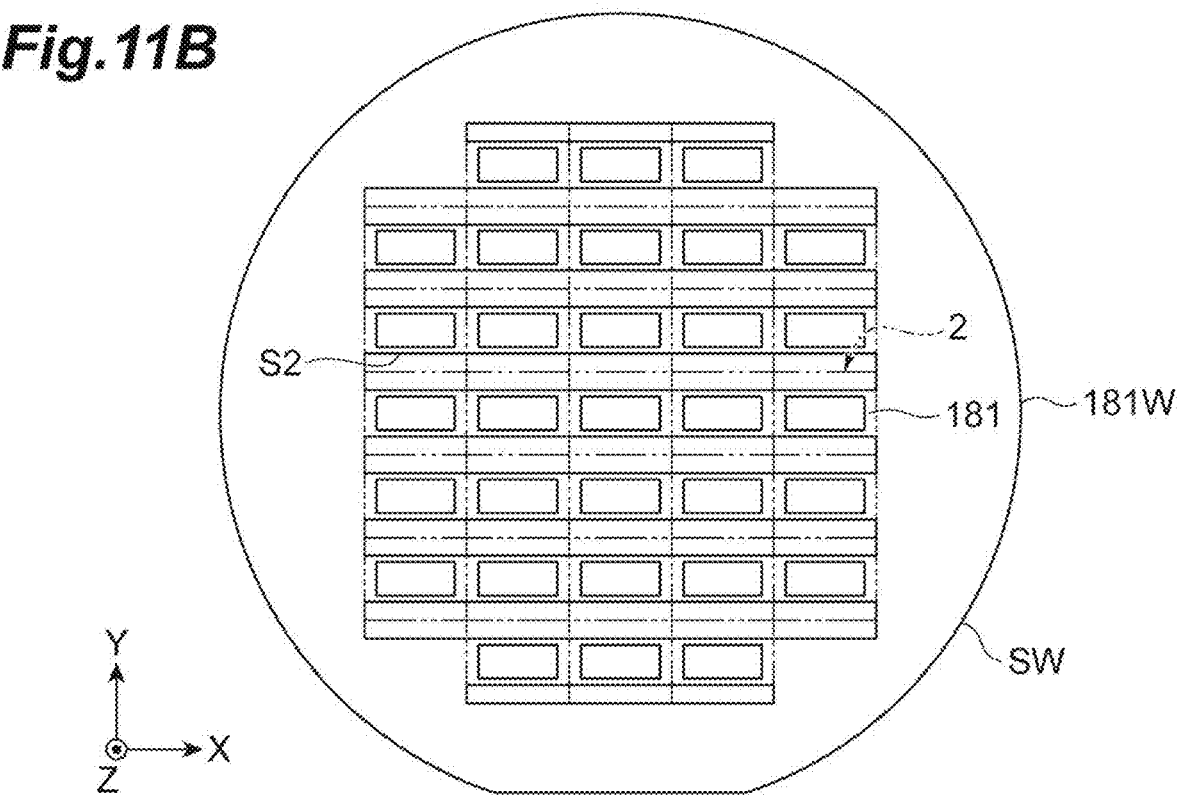

On the other hand, as illustrated in FIG. 11B, a wafer (fifth wafer) 181W including a plurality of first joining portions 181 (portions which are to be the first joining portion 181 in the mirror unit 2) is prepared (first process). In the wafer 181W, first joining portions 181 adjacent to each other in the X-axis direction are continuous, and first joining portions 181 adjacent to each other in the Y-axis direction are spaced away from each other through a slit (opening) S2 that extends in the X-axis direction. For example, the wafer 181W including the plurality of first joining portions 181 is obtained by etching a silicon wafer SW.

Figure 12A:
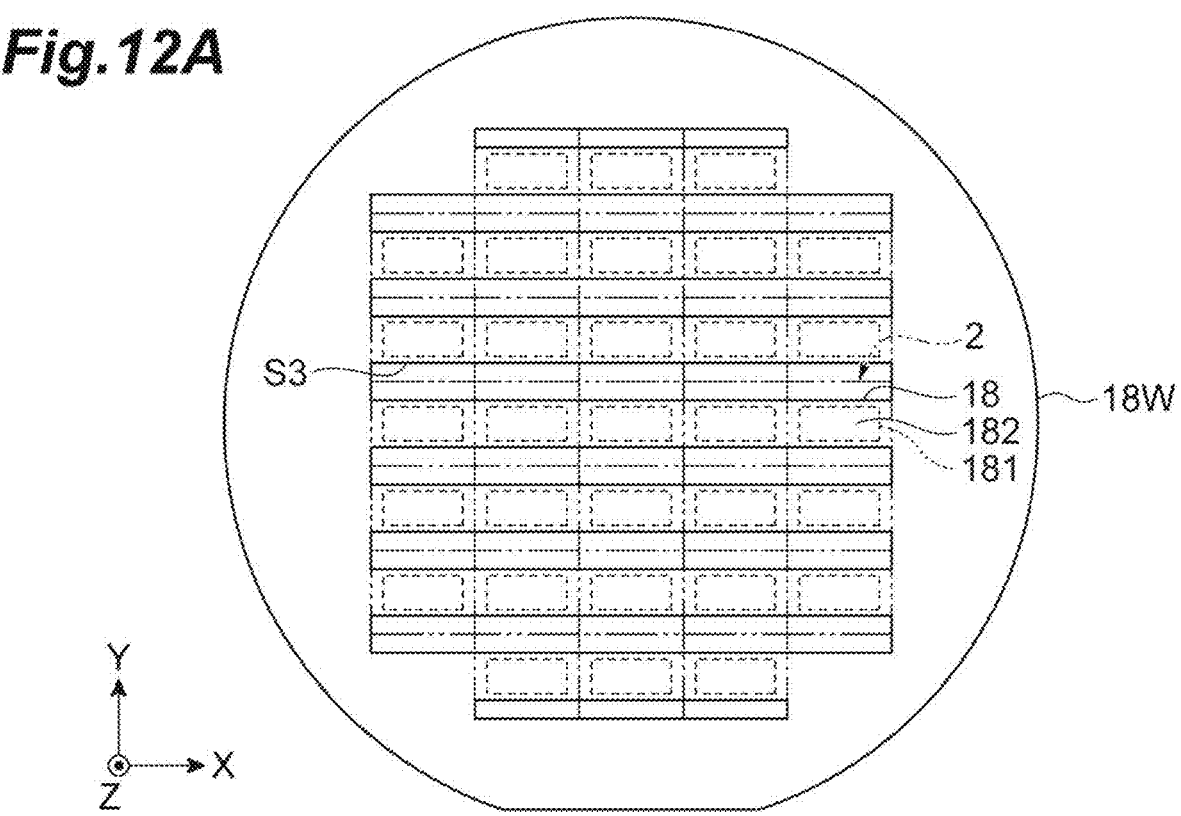
FIG. 12A and FIG. 12B are views illustrating a manufacturing process of the mirror unit illustrated in FIG. 2.

Next, as illustrated in FIG. 12A, the wafer 181W and the wafer 182W are joined by direct bonding in such a manner that one piece of the first joining portions 181 and one piece of the first main body portions 182 correspond to each other to prepare a wafer (first wafer) 18W including a plurality of the light incident/emission portions 18 (portions which are to be the light incident/emission portion 18 in the mirror unit 2) (first process). Here, as the direct bonding, for example, the plasma activation bonding, the room-temperature bonding, or the like is selected to prevent a variation of characteristics of AR coating formed in the wafer 182W. In the wafer 18W, openings S3, through which the electrode pads 211*a* and 212*a* and the electrode pads 211*b* and 212*b* provided in a waver 20W to be described later are exposed, are formed by the slits S1 and S2.

Figure 12B:
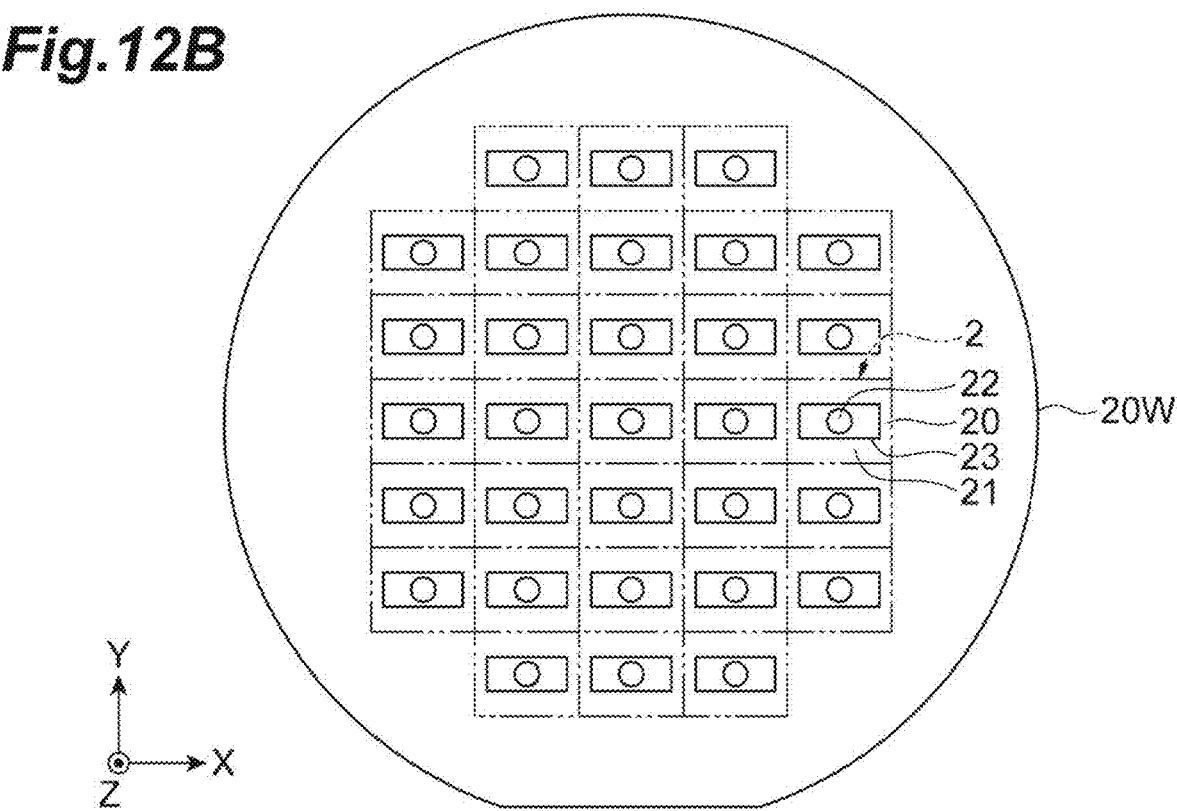
Figure 13A:
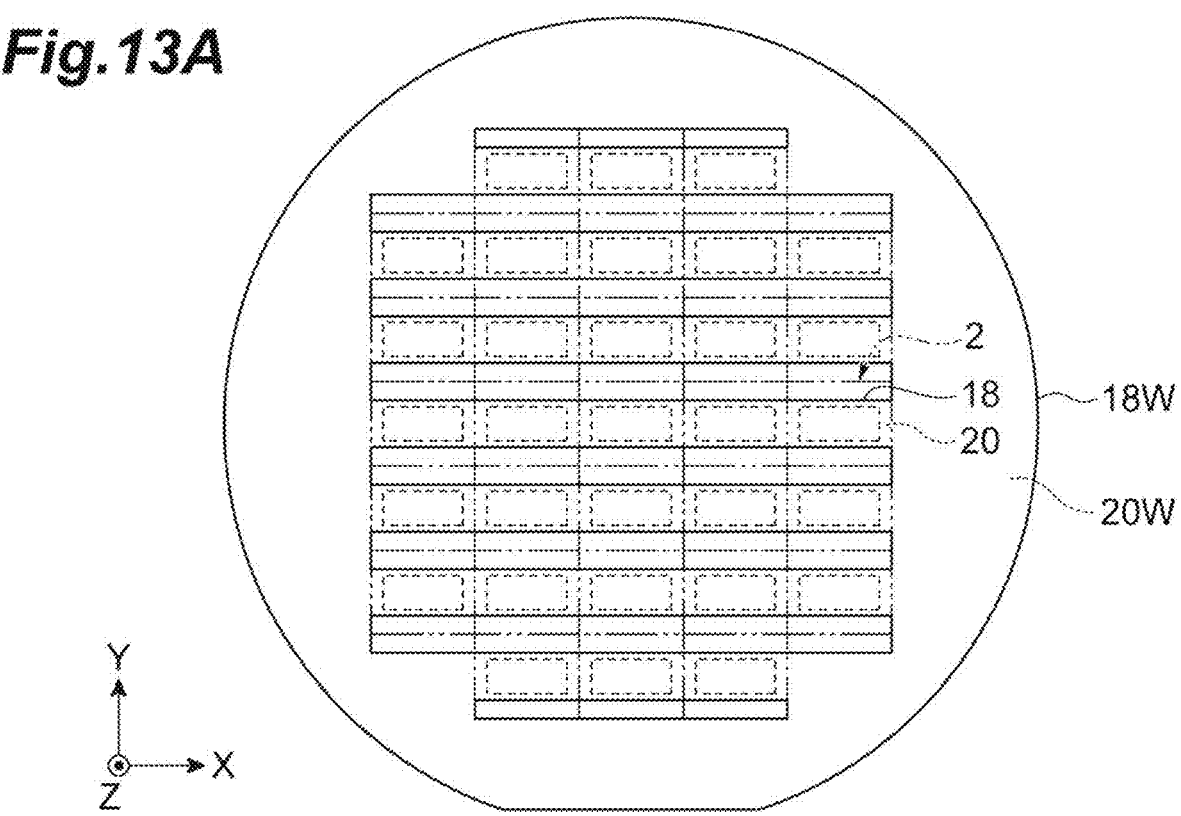
FIG. 13A and FIG. 13B are views illustrating a manufacturing process of the mirror unit illustrated in FIG. 2.

Next, as illustrated in FIG. 12B, the wafer (second wafer) 20W including a plurality of the mirror devices 20 (portions which are to be the mirror device 20 in the mirror unit 2) is prepared (first process). Next, as illustrated in FIG. 13A, the wafer 20W and the wafer 18W (the wafer 181W to which the wafer 182W are joined) are joined to each other by direct bonding in such a manner that one piece of the mirror devices 20 and one piece of the light incident/emission portions 18 correspond to each other (second process). Here, as the direct bonding, for example, the plasma activation bonding, the room-temperature bonding, or the like is selected.

Figure 13B:
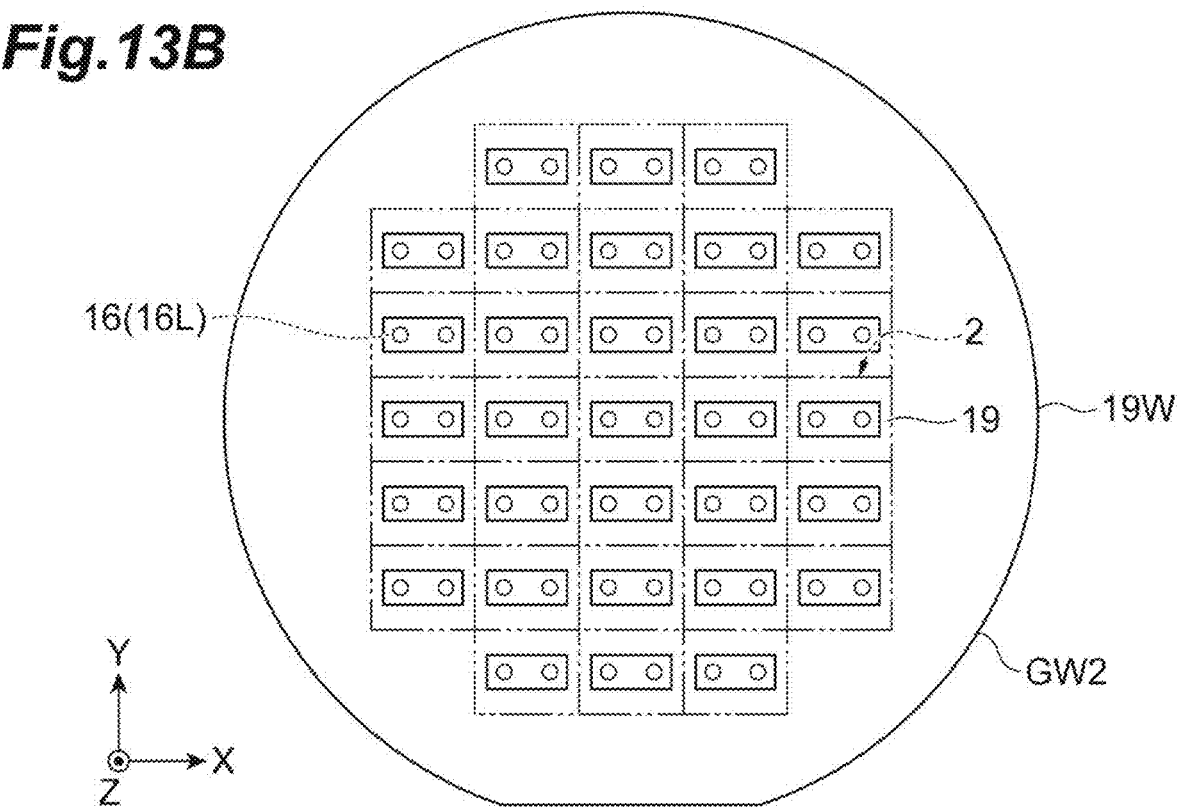

Next, as illustrated in FIG. 13B, a wafer (third wafer) 19W including a plurality of support portions 19 (portions which are to be the support portion 19 in the mirror unit 2) is prepared (first process). For example, the wafer 19W including the plurality of support portions 19 is obtained by sandblasting a glass wafer (second glass wafer) GW2. A fixed mirror layer 16L including a plurality of the fixed mirrors 16 (portions which are to be the fixed mirror 16 in the mirror unit 2) corresponding to the plurality of support portions 19 is formed in advance on a surface, which is opposite to a surface to which the wafer 20W is joined, in a surface of the glass wafer GW2.

Figure 14:
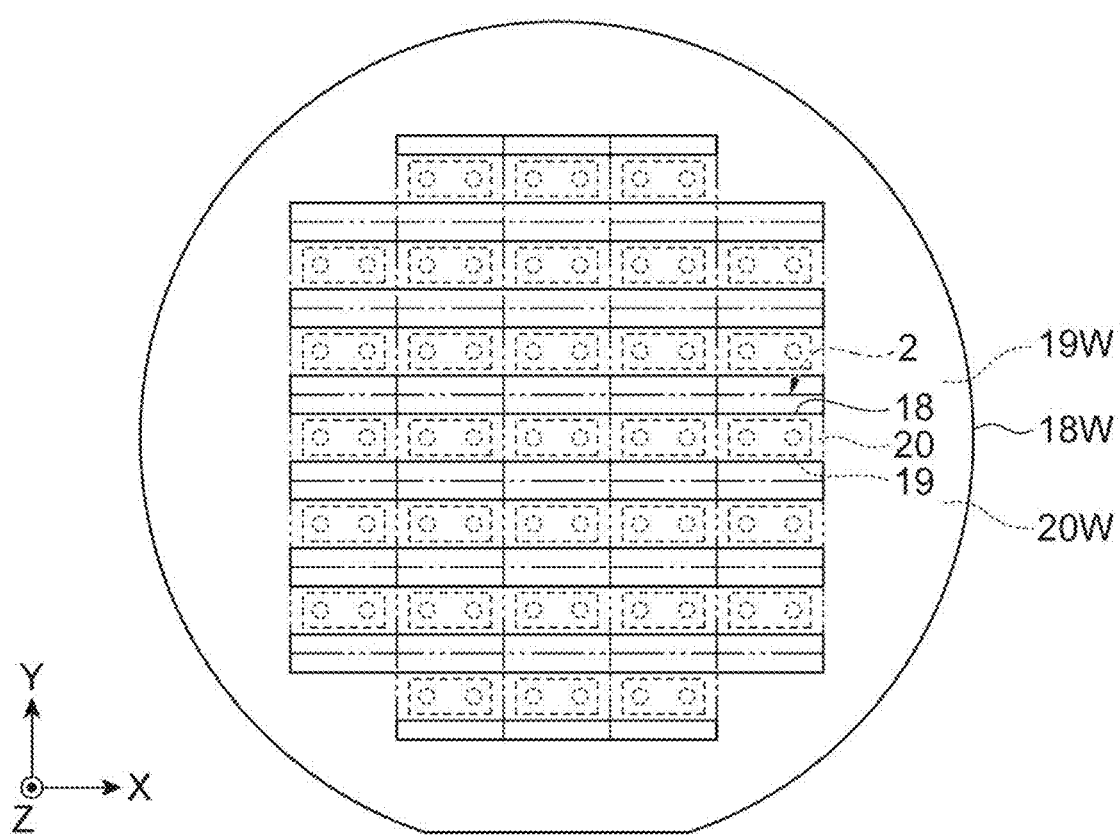
FIG. 14 is a view illustrating a manufacturing process of the mirror unit illustrated in FIG. 2.

Next, as illustrated in FIG. 14, the wafer 19W and the wafer 20W (the wafer 20W to which the wafer 18W is joined) are joined to each other by direct bonding in such a manner that one piece of the support portions 19 and one piece of the mirror devices 20 correspond to each other (second process). Here, as the direct bonding, for example, the plasma activation bonding, the room-temperature bonding, or the like is selected.

Next, the wafers 19W, 20W, and 18W which are joined to each other are cut into a plurality of the mirror units 2 (third process). At this time, even when the cutting is performed by blade dicing using water, a space for the movable mirror 22 and the drive unit 23 is air-tightly sealed, and thus breakage of the movable mirror 22 and the drive unit 23 due to water, or the like is prevented.

As described above, the method for manufacturing the mirror unit 2 includes the first process of preparing the wafer 18W including the plurality of light incident/emission portions 18, the wafer 20W including the plurality of mirror devices 20, and the wafer 19W including the plurality of support portions 19, the second process of joining the wafer 18W, the wafer 20W, and the wafer 19W in such a manner that one piece of the light incident/emission portions 18, one piece of the mirror devices 20, and one piece of the support portions 19 correspond to each other, and the third process of cutting the wafer 18W, the wafer 20W, and the wafer 19W which are joined to each other into the plurality of mirror units 2, and the openings S3, through which the electrode pads 211*a* and 212*a*, and the electrode pads 211*b* and 212*b* provided in the wafer 20W are exposed, are formed in the wafer 18W.

According to the method for manufacturing the mirror unit 2, it is possible to manufacture the mirror unit 2, which is capable of realizing reliability of electric connection with the mirror device 20, and an improvement of use efficiency of light, with efficiency. A sequence of the preparing the wafer 18W, the wafer 20W, and the wafer 19W is not particularly limited. In addition, a sequence of joining the wafer 18W, the water 20W, and the wafer 19W is not particularly limited.

in addition, in the second process, the wafer 18W, the wafer 20W, and the wafer 19W are joined to each other by direct bonding. Accordingly, it is possible to strongly join the wafer 18W, the wafer 20W, and the wafer 19W.

In addition, in the first process, the wafer 182W including the plurality of first main body portions 182, and the wafer 181W including the plurality of first joining portions 181 are prepared, and the wafer 18W is prepared by joining the wafer 182W and the wafer 181W in such a manner that one piece of the first main body portion 182 and one piece of the first joining portion 181 correspond to each other. Accordingly, it is possible to prepare the wafer 18W with efficiency.

In addition, in the first process, the wafer 182W and the wafer 181W are joined to each other by direct bonding. Accordingly, it is possible to strongly join the wafer 182W and the wafer 181W.

In addition, in the first process, the wafer 182W is prepared by sandblasting the glass wafer GW1, and the wafer 181W is prepared by etching the silicon wafer SW. Accordingly, it is possible to form the plurality of first main body portions 182 and the plurality of first joining portions 181 with efficiency.

In addition, in the first process, the wafer 19W is prepared by sandblasting the glass wafer GW2. Accordingly, it is possible to form the plurality of support portions 19 with efficiency.

In addition, in the first process, the fixed mirror layer 16L including the plurality of fixed mirrors 16 corresponding to the plurality of support portions 19 is formed in advance on a surface, which is opposite to a surface to which the wafer 20W is joined, in a surface of the glass wafer GW2 to prepare the wafer 19W. Accordingly, it is possible to form the plurality of fixed mirrors 16 with efficiency.

[Operation and Effect]

In the mirror unit 2, the second joining portion 191 of the support portion 19 is joined to the region B2a that overlaps the electrode pads 211a and 212a when viewed from the Z-axis direction and the region B2b that overlaps the electrode pads 211b and 212b when viewed from the Z-axis direction in the second surface 21b of the base 21. Accordingly, it is possible to stably perform wire bonding with respect to the electrode pads 211a, 212a, 211b, and 212b. In addition, the first joining portion 181 of the light incident/emission portion 18 is joined to a region R1a located between the electrode pads 211a and 212a and at least one of the movable mirror 22 and the drive unit 23, and a region R1b located between the electrode pads 211b and 212b and at least one of the movable mirror 22 and the drive unit 23 in the first surface 21a of the base 21. Accordingly, it is possible to make the first main body portion 182 of the light incident/emission portion 18 close to the mirror device 20 without considering physical interference with a wire 15 that is connected to each of the electrode pads 211a, 212a, 211b, and 212b, or the like. The first main body portion 182 is provided with the first light passage region 183 that overlaps the mirror surface 22a of the movable mirror 22 when viewed from the Z-axis direction, and thus it is possible to employ a configuration in which an optical element such as a beam splitter unit that allows light to be incident and emitted to and from the mirror surface 22a is made to be close to the mirror device 20. As described above, according to the mirror unit 2, it is possible to realize reliability of electric connection with the mirror device 20, and an improvement of use efficiency of light.

Particularly, in the mirror unit 2, the first joining portion 181 and the first main body portion 182 do not exist on an outer side of the electrode pads 211a and 212a in the Y-axis direction, and on an outer side of the electrode pads 211b and 212b in the Y-axis direction. Accordingly, for example, the wire 15 is brought down to the support 9 side, and thus the degree of freedom of a connection method with the wire 15 is further improved. In addition, particles, which occur during a cutting process in the method for manufacturing the mirror unit 2 as to be described below, less likely to exist on the electrode pads 211a, 212a, 211b, and 212b.

In addition, in the mirror unit 2, the first joining portion 181 surrounds the movable mirror 22 and the drive unit 23 when viewed from the Z-axis direction. Accordingly, it is possible to realize stabilization of joining between the mirror device 20 and the light incident/emission portion 18.

In addition, in the mirror unit 2, the second joining portion 191 surrounds the movable mirror 22 and the drive unit 23 when viewed from the Z-axis direction. Accordingly, it is possible to realize stabilization of joining between the mirror device 20 and the support portion 19.

In addition, in the mirror unit 2, a package that accommodates the movable mirror 22 and the drive unit 23 is constituted by the base 21, the light incident/emission portion 18, and the support portion 19. Accordingly, it is possible to suppress particles from adhering to the movable mirror 22 and the drive unit 23. In addition, the space for accommodating the movable mirror 22 and the drive unit 23 is air-tightly sealed, and thus it is possible to prevent the movable mirror 22 and the drive unit 23 from deteriorating due to humidity and the like. In this embodiment, the space for accommodating the movable mirror 22 and the drive unit 23 is set to an atmospheric pressure. In a case where the space for accommodating the movable mirror 22 and the drive unit 23 is an evacuated space (a low-pressure space of which the degree of vacuum is raised), it is possible to allow the movable mirror 22 and the drive unit 23 to smoothly operate. In a case where the space for accommodating the movable mirror 22 and the drive unit 23 is a space in which a gas is substituted with an inert gas, deformation caused by a pressure difference between an inner side and an outer side is less likely to occur, and thus, for example, the first main body portion 182 of the light incident/emission portion 18 can be made to be thin.

In addition, in the mirror unit 2, the first lateral surface 182c of the first main body portion 182 includes a surface that is spaced away from the electrode pads 211a and 212a in the Y-axis direction as being spaced away from the electrode pads 211a and 212a in the Z-axis direction, and the second lateral surface 182d of the first main body portion 182 includes a surface that is spaced away from the electrode pads 211b and 212b in the Y-axis direction as being spaced away from the electrode pads 211b and 212b in the Z axis direction. Accordingly, when performing wire bonding with respect to each of the electrode pads 211a, 212a, 211b, and 212b, as illustrated in FIG. 9, it is possible to prevent a capillary C for wire bonding from coming into contact with the first main body portion 182. In FIG. 9, an arrow represents an example of a movement trajectory of the capillary C.

In addition, in the mirror unit 2, the first main body portion 182 is provided with the light passage region 184 that overlaps the mirror surface 16a of the fixed mirror 16 when viewed from the Z-axis direction, the mirror device 20 is provided with the light passage region 24 that overlaps the mirror surface 16a of the fixed mirror 16 and the light passage region 184 when viewed from the Z-axis direction, and the second main body portion 192 is provided with the light passage region 194 that overlaps the mirror surface 16a of the fixed mirror 16, the light passage region 184, and the light passage region 24 when viewed from the Z-axis direction. Accordingly, when the beam splitter unit 3 is disposed on the first main body portion 182, it is possible to dispose the interference optical system constituted by the beam splitter unit 3, the movable mirror 22, and the fixed mirror 16 with spatial efficiency.

In addition, in the mirror unit 2, the light passage regions 183 and 184 are light transmission regions provided in the first main body portion 182, the light passage region 24 is a hole provided in the mirror device 20, and the light passage region 194 is a light transmission region provided in the second main body portion 192. Accordingly, in a case where the beam splitter unit 3 is disposed in the first main body portion 182, it is possible to correct an optical path difference that occurs between an optical path between the beam splitter unit 3 and the movable mirror 22, and an optical path between the beam splitter unit 3 and the fixed mirror 16 by adjusting a length of the light passage region 194.

In addition, in the mirror unit 2, the first joining portion 181 and the first main body portion 182 are formed separately from each other. Accordingly, it is possible to improve the degree of freedom of design of the first joining portion 181 and the first main body portion 182.

In addition, in the mirror unit 2, the second joining portion 191 and the second main body portion 192 are formed integrally with each other. Accordingly, it is possible to suppress an increase in the number of parts.

Second Embodiment

As illustrated in FIG. 15, an optical module 1B is mainly different from the above-described optical module 1A in a configuration of the support structure 12 that supports the light incident unit 4, the first light detector 6, the second light source 7, and the second light detector 8. Configurations of the mirror unit 2, the beam splitter unit 3, the support 9, and the wiring structure 11 in the optical module 1B are the same as in the above-described optical module 1A.

The support structure 12 includes a connection unit 120. The connection unit 120 includes a main body portion 121, a frame body 122, and a fixed plate 123. The main body portion 121 includes a pair of side wall portions 124 and 125, and a ceiling wall portion 126. The pair of side wall portions 124 and 125 face each other in the X-axis direction. An opening 124a is formed in the side wall portion 124 on one side in the X-axis direction. The ceiling wall portion 126 faces the support 9 in the Z-axis direction. An opening 126a is formed in the ceiling wall portion 126. For example, the main body portion 121 is integrally formed of a metal. The main body portion 121 is provided with a plurality of positioning pins 121a. The main body portion 121 is positioned with respect to the support 9 by inserting the positioning pins 121a into reference holes 9b and 9c formed in the support 9, and in this state, the main body portion 121 is attached to the support 9, for example, by a bolt.

The frame body 122 is disposed on a surface on a side opposite to the beam splitter unit 3 in the side wall portion 124. An opening of the frame body 122 faces the beam splitter unit 3 through the opening 124a of the side wall portion 124. The light incident unit 4 is disposed in the frame body 122. The fixed plate 123 is a member that fixes the light incident unit 4 disposed in the frame body 122 to the main body portion 121.

The light incident unit 4 includes a holder 41 and a collimator lens 42. The holder 41 holds the collimator lens 42, and is configured so that an optical fiber (not illustrated) that guides the measurement light L0 can be connected to the holder 41. The collimator lens 42 collimates the measurement light L0 emitted from the optical fiber. When the optical fiber is connected to the holder 41, an optical axis of the optical fiber matches an optical axis of the collimator lens 42.

The holder 41 is provided with a flange portion 41a. The flange portion 41a is disposed between the frame body 122 and the fixed plate 123. In this state, for example, when the fixed plate 123 is attached to the side wall portion 124, for example, by a bolt, the light incident unit 4 disposed in the frame body 122 is fixed to the main body portion 121. In this manner, the light incident unit 4 is disposed on one side of the beam splitter unit 3 in the X-axis direction, and is supported by the support structure 12. The light incident unit 4 allows measurement light L0 that is incident from the first light source through a measurement target or measurement light L0 that is generated from the measurement target (in this embodiment, the measurement light L0 guided by the optical fiber) to be incident to the beam splitter unit 3.

A filter 54 is attached to the frame body 122. The filter 54 has a function of allowing the measurement light L0 to be transmitted therethrough and cutting off the laser light L10. For example, the filter 54 is formed of silicon in a plate shape. The filter 54 is disposed in the opening 124a of the side wall portion 124 in a state of being inclined with respect to an optical axis of the light incident unit 4. The filter 54 closes the opening of the frame body 122 when viewed from the X-axis direction. In this manner, the filter 54 is disposed between the light incident unit 4 and the beam splitter unit 3 (that is, on the light incident unit 4 side with respect to the beam splitter unit 3), and is supported by the support structure 12 in a state of being inclined with respect to the optical axis of the light incident unit 4. In this embodiment, an optical surface of the filter 54 is a surface that is parallel to the Z-axis direction and has an angle of 10° to 20° with respect to the Y-axis direction. The angle between the optical surface of the filter 54 and an optical axis of the measurement light L0 may be other angles without limitation to 10° to 20°. The optical axis of the light incident unit 4 is parallel to the X-axis direction.

The support structure 12 further includes a holding unit 130. The holding unit 130 includes a main body portion 131. The main body portion 131 is attached to a surface of the ceiling wall portion 126 on a side opposite to the support 9. The main body portion 131 is positioned with respect to the main body portion 121 of the connection unit 120 by a plurality of positioning pins 131a, and in this state, the main body portion 131 is attached to the ceiling wall portion 126, for example, by a bolt. A first through-hole 135, a second through-hole 136, and a third through-hole 137 are formed in the main body portion 131. Each of the first through-hole 135, the second through-hole 136, and the third through-hole 137 passes through the main body portion 131 along the Z-axis direction. The first through-hole 135 is formed at a position that faces the first mirror surface 31 of the beam splitter unit 3 in the Z-axis direction. The second through-hole 136 is formed on the other side of the first through-hole 135 in the X-axis direction (that is, on a site opposite to the light incident unit 4). The third through-hole 137 is formed on the other side of the second through-hole 136 in the X-axis direction.

The first light detector 6 is disposed in the first through-hole 135. The first light detector 6 includes a light detection element 62, a package 64 including a light transmission window 64a, a holder 61, and a condensing lens 63. The package 64 accommodates the light detection element 62. The light detection element 62 detects the interference light L1 of the measurement light. For example, the light detection element 62 is an InGaAs photodiode. The holder 61 holds the package 64 and the condensing lens 63. The condensing lens 63 condenses the interference light L1 of the measurement light which is incident to the light detection element 62 through the light transmission window 64a to the light detection element 62. An optical axis of the light detection element 62 and an optical axis of the condensing lens 63 match each other.

The holder 61 is provided with a flange portion 61a. The flange portion 61a positioned with respect to the main body portion 121 of the connection unit 120 by a positioning pin 61b, and in this state, the flange portion 61a is attached to the ceiling wall portion 126 of the main body portion 121, for example, by a bolt. In this manner, the first light detector 6 is disposed on one side of the beam splitter unit 3 in the Z-axis direction, and is supported by the support structure 12. The first light detector 6 faces the first mirror surface 31 of the beam splitter unit 3 in the Z-axis direction. The first light detector 6 detects interference light L1 of the measurement light which is emitted from the beam splitter unit 3.

The second light detector 8 is disposed in the second through-hole 136. The second light detector 8 includes a light detection element 82, and a package 84 including a condensing lens 84a. The light detection element 82 detects interference light L11 of the laser light. For example, the light detection element 82 is a Si photodiode. The condensing lens 84a condenses the interference light L11 of the laser light which is incident to the light detection element 82 to the light detection element 82. An optical axis of the light detection element 82 and an optical axis of the condensing lens 84a match each other.

The package 84 is fixed to the main body portion 131 in the second through-hole 136. In this manner, the second light detector 8 is disposed on the other side of the first light detector 6 in the X-axis direction to face the same side as in the first light detector 6, and is supported by the support structure 12. The second light detector 8 detects the interference light L11 of the laser light which is emitted from the beam splitter unit 3.

The second light source 7 is disposed in the third through-hole 137. The second light source 7 includes a light-emitting element 72, and a package 74 including a collimator lens 74a. The light-emitting element 72 emits the laser light L10. For example, the light-emitting element 72 is a semiconductor laser such as VCSEL. The collimator lens 74a collimates the laser light L10 emitted from the light-emitting element 72. An optical axis of the light-emitting element 72 and an optical axis of the collimator lens 74a match each other.

The package 74 is fixed to the main body portion 131 in the third through-hole 137. In this manner, the second light source 7 is disposed on the other side of the second light detector 8 in the X-axis direction to face the same side as in the first light detector 6, and is supported by the support structure 12. The second light source 7 emits the laser light L10 to be incident to the beam splitter unit 3.

As described above, the holding unit 130 holds the first light detector 6, the second light detector 8, and the second light source 7 so that the first light detector 6, the second light detector 8, and the second light source 7 face the same side, and are aligned in the order of the first light detector 6, the second light detector 8, and the second light source 7. In this embodiment, the holding unit 130 holds the first light detector 6, the second light detector 8, and the second light source 7 so that the first light detector 6, the second light detector 8, and the second light source 7 face the other side (that is, the beam splitter unit 3 side) in the Z-axis direction on one side of the beam splitter unit 3 in the Z-axis direction. In addition, the holding unit 130 holds the first light detector 6, the second light detector 8, and the second light source 7 to be aligned in the order of the first light detector 6, the second light detector 8, and the second light source 7 from one side (that is, the light incident unit 4 side) in the X-axis direction. The holding unit 130 is a part of the support structure 12, and thus a configuration in which the holding unit 130 holds an arbitrary constituent element represents that the arbitrary constituent element is supported by the support structure 12.

A first mirror 51, a second mirror 52, and a third mirror 53 are attached to the main body portion 121 of the connection unit 120. The first mirror 51 is attached to the ceiling wall portion 126 of the main body portion 121 in the opening 126a to be located on a side opposite to the first light detector 6 with respect to the first through-hole 135. The second mirror 52 is attached to the ceiling wall portion 126 of the main body portion 121 in the opening 126a to be located on a side opposite to the second light detector 8 with respect to the second through-hole 136. The third mirror 53 is attached to the ceiling wall portion 126 of the main body portion 121 in the opening 126a to be located on a side opposite to the second light source 7 with respect to the third through-hole 137.

The first mirror 51 is a dichroic mirror that has a function of allowing the measurement light L0 to be transmitted therethrough and reflecting the laser light L10, and is inclined with respect to an optical axis of the first light detector 6. The first mirror 51 is disposed between the beam splitter unit 3 and the first light detector 6. In this embodiment, an optical surface of the first mirror 51 is a surface that is parallel to the Y-axis direction and has an angle of 45° with respect to the Z-axis direction. An optical axis of the first light detector 6 is parallel to the Z-axis direction.

The second mirror 52 is a mirror (for example, a half mirror) that has a function of reflecting a part of the laser light L10 and allowing the remainder of the laser light L10 to be transmitted therethrough and is parallel to the first mirror 51. The second mirror 52 is disposed to overlap the first mirror 51 when viewed from the X-axis direction and to overlap the second light detector 8 when viewed from the Z-axis direction. In this embodiment, an optical surface of the second mirror 52 is a surface that is parallel to the Y-axis direction, and has an angle of 45° with respect to the Z-axis direction.

The third mirror 53 is a mirror (for example, a total reflection mirror) that has a function of reflecting the laser light L10 and is parallel to the second mirror 52. The third mirror 53 is disposed to overlap the second mirror 52 when viewed from the X-axis direction, and to overlap the second light source 7 when viewed from the Z-axis direction. In this embodiment, an optical surface of the third mirror 53 is a surface that is parallel to the Y-axis direction and has an angle of 45° with respect to the Z-axis direction.

A filter 56 is disposed between the first mirror 51 and the first light detector 6. An aperture 55 is disposed between the first mirror 51 and the filter 56. In this embodiment, the aperture 55 and the filter 56 are held by the holder 61 of the first light detector 6. The aperture 55 is a member in which an opening having a circular shape is formed when viewed from the Z-axis direction. The filter 56 has a function of allowing the measurement light L0 to be transmitted therethrough and cutting off the laser light L10. For example, the filter 56 is a silicon plate in which an anti-reflection film is formed on a light incident surface.

A return light suppressing unit 57 is disposed on a side opposite to the second light detector 8 with respect to the second mirror 52. The return light suppressing unit 57 has a function of suppressing incident laser light L10 from becoming return light (that is, suppressing the laser light L10 from being reflected along an optical path of the incident laser light L10). In this embodiment, the return light suppressing unit 57 has a function of absorbing the incident laser light L10. In this embodiment, the return light suppressing unit 57 is apart of the support structure 12 that supports the second mirror 52. More specifically, the return light suppressing unit 57 is a portion that protrudes from the side wall portion 125 of the main body portion 121 of the connection unit 120 to the beam splitter unit 3 side. The return light suppressing unit 57 is constituted by forming a black resist layer on the portion, or by performing a black almite treatment to the portion. In this embodiment, the return light suppressing unit 57 has the function of absorbing the incident laser light L10 as the function of suppressing the incident laser light L10 from becoming return light, but may have a function of reflecting the incident laser light L10, for example, to the outside of the interference optical system as the function of suppressing the incident laser light L10 from becoming return light.

Here, description will be given of an optical path between the beam splitter unit 3 and the first light detector 6, and the like. The interference light L1 of the measurement light which is emitted from the beam splitter unit 3 along the Z-axis direction is transmitted through the first mirror 51, is incident to the first light detector 6 through the aperture 55 and the filter 56, and is detected by the first light detector 6. On the other hand, the laser light L10 emitted from the second light source 7 is reflected by the third mirror 53 and is transmitted through the second mirror 52, and is reflected by the first mirror 51 and is incident to the beam splitter unit 3 along the Z-axis direction. Interference light L1 of the laser light which is emitted from the beam splitter unit 3 along the Z-axis direction is reflected by the first mirror 51 and the second mirror 52, and is incident to the second light detector 8 and is detected by the second light detector 8. A part of the laser light L10 reflected by the second mirror 52 is suppressed from becoming return light due to the return light suppressing unit 57.

In the optical module 1B, a length of the optical path between the beam splitter unit 3 and the first light detector 6 is shorter than a length of an optical path between the beam splitter unit 3 and the second light detector 8, and is shorter than a length of an optical path between the beam splitter unit 3 and the second light source 7. The lengths of the optical paths represent physical distances along the optical paths.

Specifically, a distance from an intersection between the optical path and the first mirror surface 31 of the beam splitter unit 3 to a light incident surface of the first light detector 6 is shorter than a distance from an intersection between an optical path and the first mirror surface 31 of the beam splitter unit 3 to a light incident surface of the second light detector 8, and is shorter than a distance from an intersection between an optical path and the first mirror surface 31 of the beam splitter unit 3 to a light emission surface of the second light source 7. A distance from an intersection between an optical path and the first mirror surface 31 of the beam splitter unit 3 to a light incident surface of the condensing lens 63 of the first light detector 6 is shorter than a distance from an intersection between an optical path and the first mirror surface 31 of the beam splitter unit 3 to a light incident surface of the condensing lens 84a of the second light detector 8, and is shorter than a distance from an intersection between an optical path and the first mirror surface 31 of the beam splitter unit 3 to a light emission surface of the collimator lens 74a of the second light source 7. A distance from the optical surface 33a of the beam splitter unit 3 to the light incident surface of the first light detector 6 is shorter than a distance from the optical surface 33a of the beam splitter unit 3 to the light incident surface of the second light detector 8, and is shorter than a distance from the optical surface 33a of the beam splitter unit 3 to the light emission surface of the second light source 7. A distance from the optical surface 33a of the beam splitter unit 3 to the light incident surface of the condensing lens 63 of the first light detector 6 is shorter than a distance from optical surface 33a of the beam splitter unit 3 to the light incident surface of the condensing lens 84a of the second light detector 8, and is shorter than a distance from the optical surface 33a of the beam splitter unit 3 to the light emission surface of the collimator lens 74a of the second light source 7.

In this embodiment, the light incident unit 4 has a configuration in which angle adjustment of the holder 41 with respect to the frame body 122 is possible. In contrast, the first light detector 6 is fixed to the ceiling wall portion 126 of the main body portion 121, for example, by a bolt in a state of being positioned with respect to the main body portion 121 of the connection unit 120. Accordingly, in a state in which the first light detector 6 is positioned, the angle adjustment of the holder 41 can be carried out so that detection intensity in the first light detector 6 becomes the maximum while the measurement light L0 is incident to the beam splitter unit 3. In addition, in a state in which the angle adjustment is carried out, the light incident unit 4 can be fixed to the frame body 122.

Not only the light incident unit 4 but also the first light detector 6 may have a configuration in which angle adjustment of the holder 61 is possible. In addition, the second light source 7 may have a configuration in which angle adjustment is possible in a state in which the second light detector 8 is positioned. In addition, not only the second light source 7 but also the second light detector 8 may have a configuration in which the angle adjustment is possible.

Even in a case where the mirror unit 2 is applied to the optical module 1B configured as described above, according to the mirror unit 2, the same operation and effect as in the case where the mirror unit 2 is applied to the optical module 1A are obtained.

Modification Example

The present disclosure is not limited to the above described embodiments. For example, the mirror unit 2 may be provided with the beam splitter unit 3 disposed in the first main body portion 182 as a configuration of the mirror unit 2. In this case, it is possible to dispose the interference optical system constituted by the beam splitter unit 3, the movable mirror 22, and the fixed mirror 16 in the mirror unit 2 with spatial efficiency. The beam splitter unit 3 may be constituted by one optical block including the first mirror surface 31 and the second mirror surface 32. In addition, the beam splitter unit 3 may be constituted by an optical plate including the first mirror surface 31 and a member including the second mirror surface 32. In this case, a region between the first mirror surface 31 and the second mirror surface 32 may be a space.

In addition, in the first main body portion 182 of the light incident/emission portion 18, the light passage regions 183, 184, and 185 may be holes (openings) or notches. In addition, in the mirror device 20, the pair of light passage regions 24 and 25 may be notches or light transmission regions. In addition, in the second main body portion 192 of the support portion 19, the light passage regions 194 and 195 may be holes (openings) or notches.

In addition, in the mirror unit 2, the light passage regions 184, 185, 24, 25, 194, and 195 other than the light passage region 183 may not be essential. Even in a case where only the light passage region 183 is provided in the first main body portion 182 as the light passage region, light can be incident and emitted to and from the mirror surface 22a of the movable mirror 22 through the light passage region 183. In this case, it is not necessary for the support portion 19 to have an optical transmission property, and to have a thickness for formation of an optical path. In addition, the fixed mirror 16 is not necessary.

In the light incident/emission portion 18, the first joining portion 181 may not surround the movable mirror 22 and the drive unit 23 when viewed from the Z-axis direction. For example, a pair of the first joining portions 181 may be joined to the region B1a and the region B1b. In addition, the first joining portion 181 may be joined to the first surface 21a of the base 21 by means (for example, an adhesive such as an UV-curable resin, glass frit, a solder material, or the like) other than the direct bonding. Similarly, the first joining portion 181 may be joined to the first main body portion 182 by means other than the direct bonding. In addition, the first joining portion 181 and the first main body portion 182 may be formed integrally with each other.

In addition, in the support portion 19, the second joining portion 191 may not surround the movable mirror 22 and the drive unit 23 when viewed from the Z-axis direction. For example, a pair of the second joining portions 191 may be joined to the region B2a and the region B2b. In addition, the second joining portion 191 may be joined to the second surface 21b of the base 21 by means other than the direct bonding. In addition, the second joining portion 191 and the second main body portion 192 may be formed separately from each other. In this case, the second joining portion 191 may be joined to the second main body portion 192 by the direct bonding, or may be joined to the second main body portion 192 by means other than the direct bonding.

In addition, the first joining portion 181 and the first main body portion 182 may exist on an outer side of the electrode pads 211a and 212a in the Y-axis direction and on an outer side of the electrode pads 211b and 212b in the Y-axis direction. Even in this case, it is possible to make the first main body portion 182 of the light incident/emission portion 18 close to the mirror device 20 without considering physical interference with a wire 15 that is connected to each of the electrode pads 211a, 212a, 211b, and 212b, or the like.

In addition, the mirror unit 2 may be provided with the stress mitigation substrate 17 as a configuration of the mirror unit 2. In addition, the mirror unit 2 may not be provided with the fixed mirror 16 as a configuration of the mirror unit 2. in addition, the package that is constituted by the base 21 of the mirror device 20, the light incident/emission portion 18, and the support portion 19 may not be air-tightly sealed.

In addition, in the mirror device 20, the drive unit 23 may include three or greater elastic support units which elastically support the movable mirror 22. In addition, in the mirror device 20, the drive unit 23 is not limited to a configuration in which the drive unit 23 is constituted by the electrostatic actuator, and may be constituted by a piezoelectric type actuator, an electromagnetic type actuator, or the like. In addition, the mirror device 20 may be configured in such a manner that the device layer 102 is disposed on the first surface 21a side, and the support layer 101 is disposed on the second surface 21b side.

In addition, in the mirror device 20, only a plurality of the electrode pads 211a and 212a may be provided in the base 21. In this case, the second joining portion 191 of the support portion 19 may be joined to a region that overlaps the electrode pads 211a and 212a when viewed from the Z-axis direction in the second surface 21b of the base 21. Accordingly, it is possible to stably perform wire bonding with respect to the electrode pads 211a and 212a. In addition, in this case, the first joining portion 181 of the light incident/emission portion 18 may be joined to a region between the electrode pads 211a and 212a and at least one of the movable mirror 22 and the drive unit 23 in the first surface 21a of the base 21. Accordingly, it is possible to make the first main body portion 182 of the light incident/emission portion 18 close to the mirror device 20 without considering physical interference with a wire that is connected to each of the electrode pads 211a and 212a, or the like. The first main body portion 182 is provided with the light passage region 183 that overlaps the mirror surface 22a of the movable mirror 22 when viewed from the Z-axis direction, and thus it is possible to employ a configuration in which an optical element such as a beam splitter unit that allows light to be incident and emitted to and from the mirror surface 22a is made to be close to the mirror device 20.

In the mirror device 20, in a case where only the plurality of electrode pads 211a and 212a are provided in the base 21, a method for manufacturing the mirror unit 2 may include the first process of preparing the wafer 18W including the plurality of light incident/emission portions 18, the wafer 20W including the plurality of mirror devices 20, and the wafer 19W including the plurality of support portions 19, the second process of joining the wafer 18W, the wafer 20W, and the wafer 19W in such a manner that one piece of the light incident/emission portions 18, one piece of the mirror devices 20, and one piece of the support portions 19 correspond to each other, and the third process of cutting the wafer 18W, the wafer 20W, and the wafer 19W which are joined to each other into the plurality of mirror units 2, and the openings S3, through which the electrode pads 211a and 212a provided in the wafer 20W are exposed, may be formed in the wafer 18W. According to the method for manufacturing the mirror unit 2, it is possible to manufacture the mirror unit 2, which is capable of realizing reliability of electric connection with the mirror device 20, and an improvement of use efficiency of light, with efficiency.

In respective configurations provided in the mirror unit 2, there is no limitation to the above-described materials and shapes, and various materials and shapes are applicable to the configurations. In addition, the configurations of the first embodiment and the modification example are applicable to the configurations in another embodiment and the modification example in an arbitrary manner.

According to the present disclosure, it is possible to provide to provide a mirror unit and a method for manufacturing a mirror unit which are capable of realizing reliability of electric connection with the mirror device and an improvement use efficiency of light.

What is claimed is:
1. A mirror unit comprising:
a mirror device;
a light incident/emission portion that is disposed on one side of the mirror device in a first direction; and
a support portion that is disposed on the other side of the mirror device in the first direction,
wherein the mirror device includes,
a base that includes a first surface on the light incident/emission portion side and a second surface on the support portion side,
a movable mirror in which a surface on the light incident/emission portion side is a mirror surface, and a drive unit that is configured to move the movable mirror along the first direction, the base is provided with a first electrode pad and a second electrode pad which are exposed to the first surface side, the first electrode pad is located on one side with respect to at least one of the movable mirror and the drive unit in a second direction along the first surface, the second electrode pad is located on the other side with respect to at least one of the movable mirror and the drive unit in the second direction, the light incident/emission portion includes, a first joining portion that is joined to a region that is located between the first electrode pad and at least one of the movable mirror and the drive unit, and a region that is located between the second electrode pad and at least one of the movable mirror and the drive unit in the first surface, and a first main body portion that is connected to the first joining portion, and faces the movable mirror and the drive unit on the one side in the first direction, the support portion includes, a second joining portion joined to a region that overlaps the first electrode pad when viewed from the first direction, and a region that overlaps the second electrode pad when viewed from the first direction in the second surface, and a second main body portion that is connected to the second joining portion, and faces the movable mirror and the drive unit on the other side in the first direction, and the first main body portion is provided with a first light passage region that overlaps the mirror surface of the movable mirror when viewed from the first direction.

2. The mirror unit according to claim 1, wherein the first joining portion surrounds the movable mirror and the drive unit when viewed from the first direction.

3. The mirror unit according to claim 1, wherein the second joining portion surrounds the movable mirror and the drive unit when viewed from the first direction.

4. The mirror unit according to claim 1, wherein the first joining portion surrounds the movable mirror and the drive unit when viewed from the first direction, the second joining portion surrounds the movable mirror and the drive unit when viewed from the first direction, and a package that accommodates the movable mirror and the drive unit is constituted by the base, the light incident/emission portion, and the support portion.

5. The mirror unit according to claim 1, wherein the first main body portion includes a first lateral surface on the first electrode pad side in the second direction, and a second lateral surface on the second electrode pad side in the second direction, the first lateral surface includes a surface that is spaced away from the first electrode pad in the second direction as being spaced away from the first electrode pad in the first direction, and the second lateral surface includes a surface that is spaced away from the second electrode pad in the second direction as being spaced away from the second electrode pad in the first direction.

6. The mirror unit according to claim 1, further comprising:

a fixed mirror which is provided on a surface of the second main body portion on a side opposite to the mirror device, and in which a surface on the mirror device side is a mirror surface, the first main body portion is provided with a second light passage region that overlaps the mirror surface of the fixed mirror when viewed from the first direction, the mirror device is provided with a third light passage region that overlaps the mirror surface of the fixed mirror and the second light passage region when viewed from the first direction, and the second main body portion is provided with a fourth light passage region that overlaps the mirror surface of the fixed mirror, the second light passage region, and the third light passage region when viewed from the first direction.

7. The mirror unit according to claim 6, wherein the first light passage region and the second light passage region are light transmission regions which are provided in the first main body portion, the third light passage region is a hole that is provided in the mirror device, and the fourth light passage region is a light transmission region that is provided in the second main body portion.

8. The mirror unit according to claim 6, further comprising:

a beam splitter unit that is disposed in the first main body portion and constitutes an interference optical system in combination with the movable mirror and the fixed mirror.

9. The mirror unit according to claim 1, wherein the first joining portion and the first main body portion are formed separately from each other.

10. The mirror unit according to claim 1, wherein the second joining portion and the second main body portion are formed integrally with each other.

11. A method for manufacturing the mirror unit according to claim 1, the method comprising:

a first process of preparing a first wafer including a plurality of the light incident/emission portions, a second wafer including a plurality of the mirror devices, and a third wafer including a plurality of the support portions;

a second process of joining the first wafer, the second wafer, and the third wafer in such a manner that one piece of the light incident/emission portions, one piece of the mirror devices, and one piece of the support portions correspond to each other, and a third process of cutting the first wafer, the second wafer, and the third wafer which are joined into a plurality of the mirror units, wherein openings, through which the first electrode pad and the second electrode pad provided in the second wafer are exposed, are formed in the first wafer.

12. The method for manufacturing the mirror unit according to claim 11, wherein in the second process, the first wafer, the second wafer, and the third wafer are joined to each other by direct bonding.

13. The method for manufacturing the mirror unit according to claim 11, wherein in the first process, a fourth wafer including a plurality of the first main body portions and a fifth wafer including a plurality of the first joining portions are prepared, and the first wafer is prepared by joining the fourth wafer and the fifth wafer in such a manner that one piece of the first main body portions and one piece of the first joining portions correspond to each other.

14. The method for manufacturing the mirror unit according to claim 13,
wherein in the first process, the fourth wafer and the fifth wafer are joined to each other by direct bonding.

15. The method for manufacturing the mirror unit according to claim 13,
wherein in the first process, the fourth wafer is prepared by sandblasting a first glass wafer, and the fifth wafer is prepared by etching a silicon wafer.

16. The method for manufacturing the mirror unit according to claim 11,
wherein in the first process, the third wafer is prepared by sandblasting a second glass wafer.

17. The method for manufacturing the mirror unit according to claim 16,
wherein in the first process, the third wafer is prepared by forming a fixed mirror layer including a plurality of fixed mirrors corresponding to the plurality of support portions in advance on a surface that is opposite to a surface to which the second wafer is joined in a surface of the second glass wafer.

18. A mirror unit comprising:
a mirror device;
a light incident/emission portion that is disposed on one side of the mirror device in a first direction; and
a support portion that is disposed on the other side of the mirror device in the first direction,
wherein the mirror device includes,
a base that includes a first surface on the light incident/emission portion side and a second surface on the support portion side,
a movable mirror in which a surface on the light incident/emission portion side is a mirror surface, and
a drive unit that is configured to move the movable mirror along the first direction,
the base is provided with a first electrode pad that is exposed to the first surface side,
the first electrode pad is located on one side with respect to at least one of the movable mirror and the drive unit in a second direction along the first surface,
the light incident/emission portion includes,
a first joining portion that is joined to a region that is located between the first electrode pad and at least one of the movable mirror and the drive unit in the first surface, and
a first main body portion that is connected to the first joining portion, and faces the movable mirror and the drive unit on the one side in the first direction,
the support portion includes,
a second joining portion joined to a region that overlaps the first electrode pad when viewed from the first direction in the second surface, and
a second main body portion that is connected to the second joining portion, and faces the movable mirror and the drive unit on the other side in the first direction, and
the first main body portion is provided with a first light passage region that overlaps the mirror surface of the movable mirror when viewed from the first direction.

19. A method for manufacturing the mirror unit according to claim 18,
a first process of preparing a first wafer including a plurality of the light incident/emission portions, a second wafer including a plurality of the mirror devices, and a third wafer including a plurality of the support portions;
a second process of joining the first wafer, the second wafer, and the third wafer in such a manner that one piece of the light incident/emission portions, one piece of the mirror devices, and one piece of the support portions correspond to each other; and
a third process of cutting the first wafer, the second wafer, and the third wafer which are joined into a plurality of the mirror units,
wherein an opening, through which the first electrode pad provided in the second wafer is exposed, is formed in the first wafer.

* * * * *